US009680188B2

(12) United States Patent
O'Hora

(10) Patent No.: US 9,680,188 B2
(45) Date of Patent: Jun. 13, 2017

(54) PORTABLE AND MODULAR ENERGY STORAGE FOR MULTIPLE APPLICATIONS AND ELECTRIC VEHICLES

(71) Applicant: Gerard O'Hora, Brighton, MA (US)

(72) Inventor: Gerard O'Hora, Brighton, MA (US)

(73) Assignee: Gerard O'Hora, Brighton, MA (US)

( * ) Notice: Subject to any disclaimer, the term of this patent is extended or adjusted under 35 U.S.C. 154(b) by 0 days.

(21) Appl. No.: 15/225,620

(22) Filed: Aug. 1, 2016

(65) Prior Publication Data
US 2017/0033337 A1 Feb. 2, 2017

Related U.S. Application Data

(60) Provisional application No. 62/199,835, filed on Jul. 31, 2015, provisional application No. 62/368,880, filed on Jul. 29, 2016.

(51) Int. Cl.
*H01M 10/44* (2006.01)
*H01M 10/42* (2006.01)
(Continued)

(52) U.S. Cl.
CPC ....... *H01M 10/425* (2013.01); *B60L 11/1816* (2013.01); *H01G 11/10* (2013.01);
(Continued)

(58) Field of Classification Search
CPC ............................ H01M 2/1077; H01M 10/44
(Continued)

(56) References Cited

U.S. PATENT DOCUMENTS 7,059,769 B1 * 6/2006 Potega ................ B60L 11/1861
  338/22 R
8,830,676 B2 * 9/2014 Borck ................. H01M 2/1061
  165/104.33
(Continued)

OTHER PUBLICATIONS

MBEAM, "The Modular Battery Exchange System: A Common Sense Approach to Full Adoption of Clean Electric Transportation," 10 pages. Retrieved from http://www.modularexchange.com/?page_id=141 Accessed on Jul. 1, 2016.
(Continued)

*Primary Examiner* — Samuel Berhanu
*Assistant Examiner* — Tessema Kebede
(74) *Attorney, Agent, or Firm* — Kilpatrick Townsend & Stockton LLP

(57) ABSTRACT

A removable modular battery pack may include a first housing having a volume of at least 0.125 cubic feet, and a plurality of battery cells providing at least 1 kW of power. The modular battery pack may also include a processing system that aggregates power from the plurality of battery cells, and a first interface that communicates a status of the modular battery pack to a second housing. The modular battery pack may further include a second interface that transmits the aggregated power to the second housing, and a thermal material enclosed in the first housing. The thermal material may be arranged in the housing adjacent to the plurality of battery cells to transfer heat away from the plurality of battery cells and to transfer the heat to the second housing.

17 Claims, 16 Drawing Sheets

(51) Int. Cl.
*H01M 2/10* (2006.01)
*H02J 7/00* (2006.01)
*H01M 10/613* (2014.01)
*H01M 10/625* (2014.01)
*H01M 10/6556* (2014.01)
*H01M 10/6568* (2014.01)
*H01M 10/6569* (2014.01)
*B60L 11/18* (2006.01)
*H01G 11/10* (2013.01)
*H01M 10/0525* (2010.01)
*H01G 11/18* (2013.01)
*H01G 11/82* (2013.01)
*H01M 2/20* (2006.01)
*H01M 10/48* (2006.01)
*H01M 10/617* (2014.01)

(52) U.S. Cl.
CPC ............ *H01G 11/18* (2013.01); *H01G 11/82* (2013.01); *H01M 2/1005* (2013.01); *H01M 2/1077* (2013.01); *H01M 2/206* (2013.01); *H01M 10/0525* (2013.01); *H01M 10/44* (2013.01); *H01M 10/441* (2013.01); *H01M 10/486* (2013.01); *H01M 10/613* (2015.04); *H01M 10/617* (2015.04); *H01M 10/625* (2015.04); *H01M 10/6556* (2015.04); *H01M 10/6568* (2015.04); *H01M 10/6569* (2015.04); *H02J 7/0021* (2013.01); *H02J 7/0052* (2013.01); *H02J 7/0063* (2013.01); *H01M 2010/4271* (2013.01); *H01M 2010/4278* (2013.01); *H01M 2220/20* (2013.01); *Y02T 10/7011* (2013.01)

(58) Field of Classification Search
USPC .......................................................... 320/128
See application file for complete search history.

(56) References Cited

U.S. PATENT DOCUMENTS

| | | | |
|---|---|---|---|
| 2010/0104927 A1* | 4/2010 | Albright | H01M 2/0242 429/50 |
| 2013/0164567 A1* | 6/2013 | Olsson | H01M 10/488 429/7 |
| 2015/0037649 A1* | 2/2015 | Wyatt | H01M 10/625 429/120 |
| 2016/0093848 A1* | 3/2016 | DeKeuster | H01M 2/1077 429/71 |

OTHER PUBLICATIONS

MBEAM, "First Updated Module," 18 pages. Retrieved from http://www.modularexchange.com/?p=314 Access on Jul. 1, 2016.

* cited by examiner

PORTABLE AND MODULAR ENERGY STORAGE FOR MULTIPLE APPLICATIONS AND ELECTRIC VEHICLES

CROSS-REFERENCES TO RELATED APPLICATIONS

This application claims the benefit of U.S. Provisional Patent Application No. 62/199,835 filed on Jul. 31, 2015, which is incorporated herein by reference. This application also claims the benefit of U.S. Provisional Patent Application No. 62/368,880 filed on Jul. 29, 2016, which is incorporated herein by reference.

BACKGROUND

The technology revolution of the past two decades has led to many changes—from the Internet and social media to mobile phones and tablets. What often gets overlooked are the indirect developments that technology has enabled. Small, power-hungry devices forced research into new battery chemistries such as lithium-ion in the 2000s, and now chemistries are emerging that offer ten times the performance. Technology is enabling the green movement through the Internet of Things (IoT) and the sensors, monitoring, and management capabilities it affords. Technology is also enabling the automotive industry to develop new vehicle platforms that are cleaner, faster, require less maintenance, and soon may not even require a driver. Finally, technology is enabling the energy and utility industries to migrate from fossil-fuel power plants and their clients to avail of more efficient and effective delivery and transmission methods. These industries are now converging around a single concept: energy storage.

BRIEF SUMMARY

In some embodiments, a removable modular battery pack may include a first housing having a volume of at least 0.125 cubic feet, and a plurality of battery cells enclosed in the first housing. The plurality of battery cells may provide at least 1 kW of power. The modular battery pack may also include a processing system enclosed in the housing that aggregates power from the plurality of battery cells. The modular battery pack may additionally include a first interface that communicates a status of the modular battery pack to a second housing. The second housing may be configured to removably receive a plurality of modular battery packs. The modular battery pack may further include a second interface that transmits the aggregated power from the plurality of battery cells from the processing system to the second housing, and a thermal material enclosed in the first housing. The thermal material may be arranged in the housing adjacent to the plurality of battery cells to transfer heat away from the plurality of battery cells and to transfer the heat to the second housing.

In some embodiments, the aggregated power from the plurality of battery cells may be transmitted to a motor of an electric or hybrid electric vehicle. The thermal material may include a thermally conductive fluid. The battery pack may include an first inlet valve that mates with a first outlet valve on the second housing where the thermally conductive fluid is pumped from the second housing into the first inlet valve, and a second outlet valve that mates with a second inlet valve on the second housing where the thermally conductive fluid is pumped from the modular battery pack through the second outlet valve to the second housing. The processing system may include a temperature sensor; and the processing system may control a flow of the thermally conductive fluid into the first housing based on temperature readings received from the temperature sensor. The thermal material may include a nonconductive extinguishing agent. The plurality of battery cells may be grouped in a plurality of battery sub-modules that are individually packaged within the first enclosure. Each of the plurality of battery sub-modules may include a processor that communicates with the processing system of the modular battery pack. The modular battery pack may include between 5 and 9 battery sub-modules, and each of the plurality of battery sub-modules may include between 10 and 16 lithium-ion 18650 battery cells. The battery pack may also include tubing that is routed adjacent to each of the plurality of battery sub-modules, where the thermal material flows through the tubing.

In some embodiments, a method of providing power through a modular battery pack may include inserting the modular battery pack into a second housing. The modular battery pack may include a first housing having a volume of at least 0.125 cubic feet, and the second housing may be configured to removably receive a plurality of modular battery packs. The method may also include communicating, through a first interface of the modular battery pack, a status of the modular battery pack to the second housing. The method may additionally include aggregating, through a processing system of the modular battery pack, power from a plurality of battery cells enclosed in the first housing. The plurality of battery cells may provide at least 1 kW of power. The method may further include providing, through a second interface of the modular battery pack, the aggregated power from the plurality of battery cells from the processing system to the second housing. The method may also include transferring heat away from the plurality of battery cells using a thermal material enclosed in the first housing. The thermal material may be arranged in the housing adjacent to the plurality of battery cells to transfer heat away from the plurality of battery cells and to transfer the heat to the second housing.

In some embodiments, the thermal material may include a solid material, and the first housing of the modular battery pack may be hermetically sealed. The plurality of battery cells may include a plurality of supercapacitors. The first interface may include a wireless communication system that communicates wirelessly with the second housing. The second interface may include a transmitter coil that wirelessly transmits the aggregated power from the plurality of battery cells to the second housing. The second interface may include a two-pole wired port that mates with a corresponding two-pole wired port of the second housing. The volume of the first housing may be at least 0.50 cubic feet, having dimensions of approximately 6"×6"×12". The method may also include communicating, through the first interface of the modular battery pack, a charge history of the modular battery pack to the second housing. The aggregated power from the plurality of battery cells provided to the second housing may include a signal of approximately 48 VDC and 45 A. The method may also include receiving, through the second interface of the modular battery pack, charging power from the second housing, and charging the plurality of battery cells of the modular battery pack using the charging power from the second housing.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
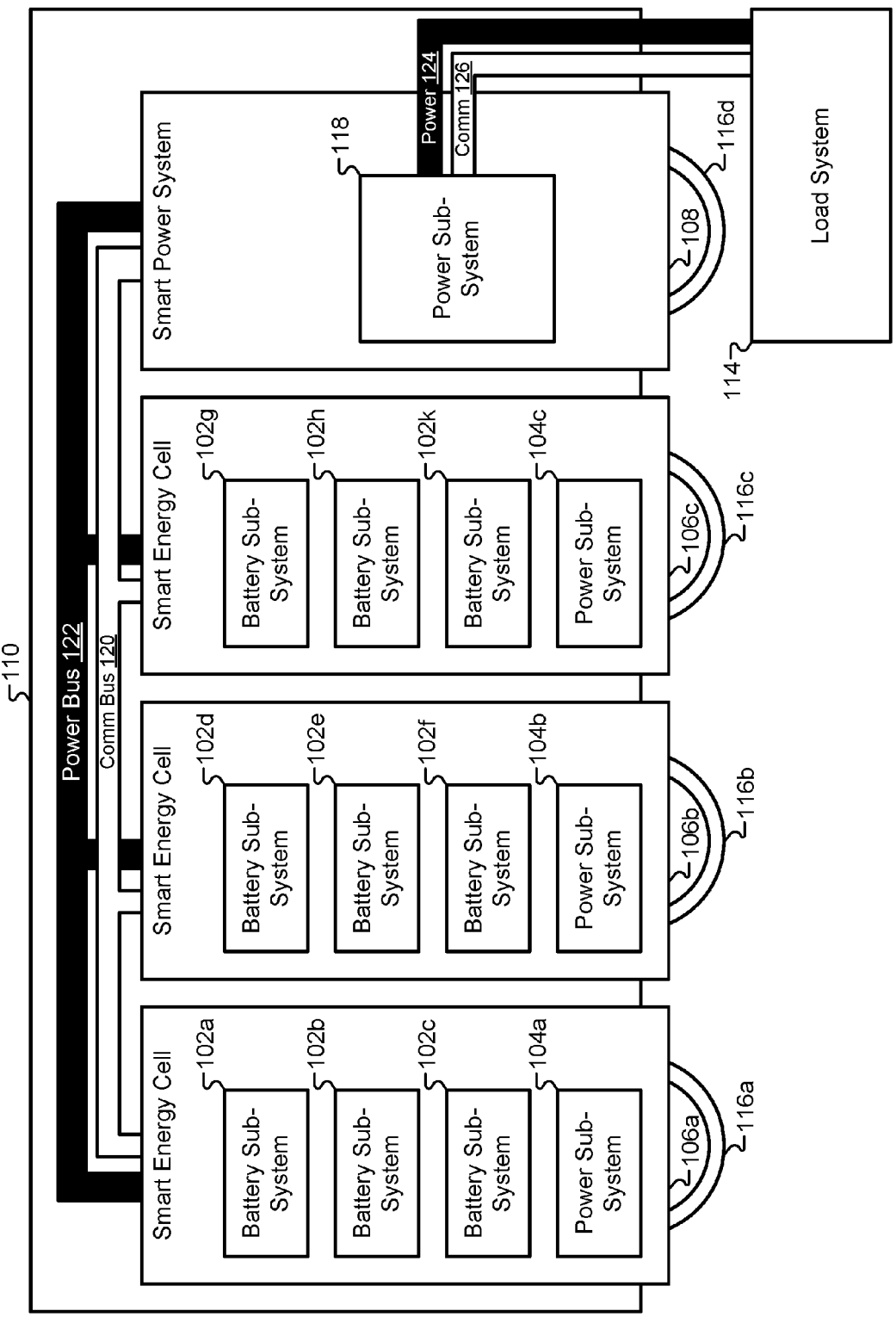
FIG. 1 illustrates a power system that includes removable modular battery packs, according to some embodiments.

Described herein, are embodiments for an energy storage solution including an energy module as part of a modular energy platform and ecosystem that allows the evolving hybrid car and electric vehicle (EV) industry, along with many other industries, to overcome their current battery limitations. Specifically, rather than waiting for an EV to recharge, users can swap out the energy cell modules and be back on the road in possibly less time than it would take to fill an average gas tank. The energy modules may be similar in practice to rechargeable batteries, but may be constructed in a unique manner that allows for high energy density (e.g., on the order of 1 kWh or greater per 10 lb cell or more) using a modular, removable package. This power system is unique in that the energy cell modules may be used across a variety of industries and applications.

In some embodiments, a home charging station can use a standard household outlet to charge multiple energy modules since the charging window may be extended significantly compared to the power demands of charging a vehicle directly. When returning from a trip, users can swap spent energy modules from an EV with fresh energy modules from the home charging station instead of waiting for a non-removable battery to recharge. This same concept can be applied to commercial sites, traditional gas stations, and other available sites. A commercial charging station can store and charge batteries, and through either an automated kiosk setup or a traditional attendant setup, users can swap their spent energy modules with freshly charged units. Unlike traditional gas stations that require large forecourts, storage tanks, special permitting, and environmental challenges, these kiosks that can be sized to occupy less than a standard parking spot can sit in urban areas as self-serve fuel stops. For a Commercial Real Estate (CRE) location, these stations can also support a building's emergency power needs along with providing a service to their tenants.

This distributed energy storage platform, which can be located in homes, commercial locations, fuel stations, and more, can be an integral part of a utility's demand response (DR) solution. The energy stored in the removable, modular battery packs can flow back into the grid when required, either during peak load or service outages. They can also support the individual site's power needs, thereby offsetting the peak load demand usage.

The embodiments described herein provide the same energy storage capacity as found in an EV in a package that weighs 400 lbs or less. One benefit of these embodiments is to package these technologies into Smart Energy Cells (SECs) that range from 5-40 lbs, depending on their application, with a 10 lb module being one module size for the typical EV. This provides a manageable weight that an average person can lift to swap modules. Since these SECs make the vehicle significantly lighter, it can achieve higher miles/kW, allowing for greater distance, less battery capacity, or both. This appeals to people who previously shunned EVs because of performance concerns.

In one embodiment, a SEC will deliver an approximate 48V output and between 1-20 kWh capacity, or more. The 48V output is corresponds to an operating voltage for most communications infrastructures and other systems, and would thus increase the number of compatible applications. Using multiples of that voltage, these embodiments can achieve a normalized 120/240 VAC for both residential and commercial applications, and a 336 VDC for the typical EV motor. However, other specific voltages may be achieved using the architecture described below.

Each SEC can be constructed by using a common chassis physical envelope that incorporates cooling capabilities, electronics, electrical connections, and/or other components. The battery submodules may contain battery cells or supercapacitors that can vary according to evolving battery technologies, including lithium ion-sulphur, carbon nanotubes, or potentially even next generation fuel-cells.

FIG. 1 illustrates a power system that includes removable modular battery packs, according to some embodiments. The system includes a plurality of smart energy cells (SECs) 106. Throughout this disclosure, the SECs 106 may be referred to as "modular battery packs," "removable modular battery packs," and/or "energy modules," and these terms may be used interchangeably. The SECs 106 represent the basic energy storage components of the power system that allow for the removal and transfer of energy storage from devices and systems that consume power, in contrast to existing batteries, for example, for electric vehicles that are fixed in location and arrangement and require special operations to move or replace.

Each SEC may include one or more battery subsystems 102. Throughout this disclosure, the battery subsystems 102 may also be referred to as "battery submodules (BSM)," and these terms may be used interchangeably. The battery submodules provide a standardized structure/framework to support one or more energy storage devices, such as battery cells or super capacitors. Each SEC may also include a power subsystem 104. The power subsystem 104 may also be referred to as a "communication submodule (CSM)," and these terms may be used interchangeably. The power subsystems 104 provide a standardized means to aggregate all of the electrical connections in the SEC and provide a standardized output. The power subsystems 104 also manage communications between each of the battery subsystems 102 and the rest of the power system.

Each SEC may also include a housing, referred to herein as a "first housing," and/or a handle 116. The handle 116 and the housing combine to make each SEC a removable, modular unit that can be readily removed from the power system by a user and replaced with a similar SEC. In some embodiments, the handle 116 on each SEC can be used to carry the SEC, and to lock the SEC in place within the power system by turning or depressing the handle 116 when the SEC is inserted.

The power system may include a smart enclosure (SE) 110, which may also be referred to herein as a "second housing" to distinguish it from the first housing of the SECs. The smart enclosure 110 may include a power bus that links the power provided by each of the SECs to a smart power system 108. The smart enclosure 110 may also include a communication bus 120 that communicatively couples each of the SECs to the smart power system 108. The smart enclosure 110 provides a containment unit and structure to support a number of SECs along with their respective electrical connections. The smart enclosure 110 provides physical and electrical couplings that hold the SECs in place and connect the SECs to the rest of the power system.

The power system may also include a smart power system 118, which may also be referred to herein as a "smart power module (SPM)" and/or a "power module (PM)." The smart power system 108 may include a power subsystem 118 that is similar to the power subsystems 104 of the SECs 106. The power subsystem 118 of the smart power system 108 may also include a housing and handle 116 that is similar to those of the SECs 106. Therefore, the smart power system 108 may have a physical form factor that is similar to or identical to the SECs 106. The power subsystem 118 of the smart power system 108 can communicate with each of the SECs 106 to authenticate their identity and thereby enable the SECs 106 to transmit power to the smart power system 108. The power subsystem 118 can also communicate with the power subsystems 104 of the SECs 106 to identify the electrical characteristics of each of the SECs 106. The power subsystem 118 can then aggregate the power provided by each SEC and generate a waveform (e.g., VDC, VAC, etc.) corresponding to a set of stored parameters in the power subsystem 118. The generated waveform can be transmitted via a power output 124 through the smart enclosure 110 to a load system 114. The load system 114 can, for example, include electric vehicles, consumer and/or residential electrical systems, power grids, and/or the like. Additionally, the power subsystem 118 can include a communication output 126 to provide status, diagnostic, historical, and/or command information to/from the load system 114.

FIG. 1 represents a general overview of the power system described herein. The remainder of this disclosure will describe each of the components and subsystems described above in greater detail.

Figure 2:
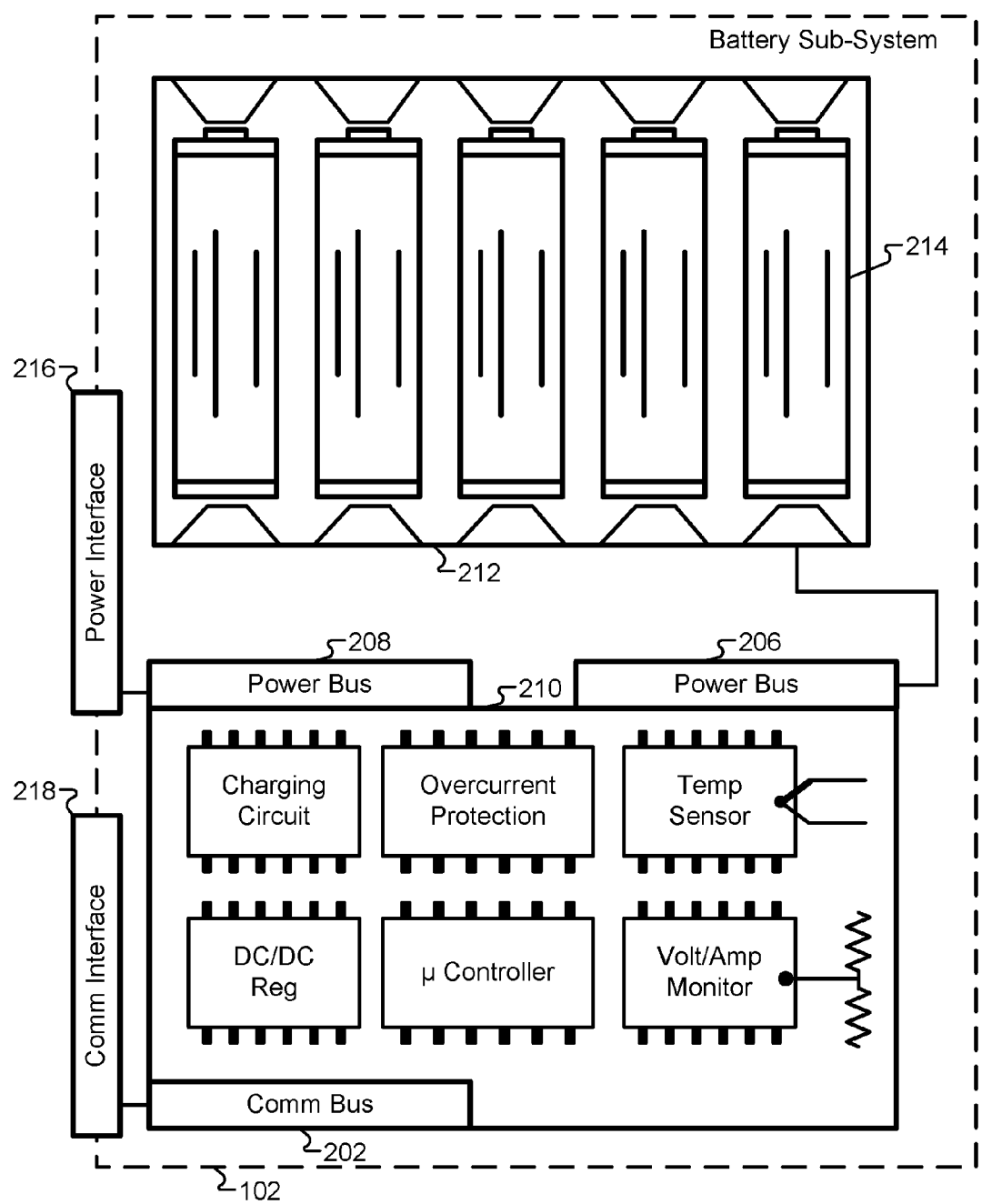
FIG. 2 illustrates a simplified diagram of a battery subsystem, according to some embodiments.

FIG. 2 illustrates a simplified diagram of a battery subsystem 102, according to some embodiments. Each SEC may include a plurality of battery cells that are used to store and provide electrical power. The plurality of battery cells may be divided into a plurality of groups that can be managed as groups. These groups are represented by the battery subsystem 110. In some embodiments, each SEC may include seven battery subsystems 102, or between five and nine battery subsystems 102.

The battery subsystem may include a plurality of individual battery cells 214. In some embodiments, the individual battery cells may be implemented using lithium-ion 18650 battery cells. In other embodiments, the individual battery cells may also include other storage technologies, such as super capacitors. The battery subsystem 102 may include mechanical supports that secure the batteries, either through friction fit or a clamping mechanism. Springs or solder connections may also be used to secure the battery cells 214 within the battery subsystem 102. In one embodiment, each battery subsystem 102 may include 13 lithium-ion 18650 batteries, or between 10 and 16 lithium-ion batteries.

The battery subsystem 102 may include a physical housing that mechanically fastens to the internal structure of the SEC. The housing may protect the battery cells 214 and keep them fixed in place. In some embodiments, the housing of the battery subsystem 102 may be a rectangular cube such that each of the battery subsystems 102 in the SEC can be inserted adjacently within a rectangular cube housing of the SEC. In some embodiments, the battery subsystem 102 may incorporate or be constructed using an intumescent material for fire protection.

In addition to providing a physical connection for the plurality of battery cells 214, the battery subsystem 102 may also include a processing system 210 that electrically and/or communicatively couples the battery subsystem 102 to the power subsystem of the SEC. A power bus 206 can receive the power provided from the battery cells 214, and the processing system 210 can perform various functions on the received power. In some embodiments, the processing system may include an overcurrent protection ship that protects the battery cells 214 and the rest of the processing system 210 when both charging and discharging the battery cells 214. The processing system 210 may also include a microcontroller that communicates through a communication bus 202 and communication interface 218 in the housing of the battery subsystem 201 with the rest of the SEC. The microcontroller can control the state of the battery subsystem 102 with regards to charging and discharging.

The power system 210 may also include a second power bus 208 and a power interface 216 in the housing of the battery subsystem 102. In some embodiments, the power bus 208 may be replaced with a dedicated wired connection between the SEC and the smart power system 108. The power interface 216 can both receive power from the SEC and provide power to the SEC depending on the state of the processing system 210. During a charging state, a charging circuit can receive power through the power interface 216 and charge the battery cells 214. During a discharging state, the processing system 210 can receive power from the battery cells 214 and use a DC/DC regulator to provide clean power to the power interface 216. The power interface 216 can connect to internal power rails of the SEC, which can be combined to provide the overall electrical output of the SEC. The output from each battery subsystem 102 may be controlled by the power subsystem of the SEC that governs the status, performance, and functionality of the SEC.

In some embodiments, the processing system 210 may also include a memory that stores lifecycle information for the battery cells 214 and/or for the battery submodule 102 specifically. The memory can store a number of charge/discharge cycles that the battery cells 214 have undergone. The memory can also store specific voltage/current capabilities of the power cells 214 and of the battery subsystem 102 as a whole. The memory can store a serial number or other identification number for the battery subsystem 102. The microcontroller can transmit the serial number through the communication interface 218 to the power subsystem of the SEC, which can then use the serial number to determine the electrical characteristics of the battery cells 214. For example, lithium-ion batteries may have a longer lifetime than super capacitors, but may charge more slowly. These electrical characteristics can be considered by the microcontroller when governing the operations of the charging circuit. In some embodiments, battery management and monitoring capabilities may be used to auto-detect the chemistries of the connect the battery cells. In these embodiments, the processing system 210 can predict the remaining lifecycle of the battery cells 214.

In some embodiments, the processing system 210 may also include state of health sensors that provide a real-time status of the battery subsystem 102. For example, some embodiments may include a temperature sensor that monitors the temperature of the battery cells 214. As battery cells are discharged, they often generate excessive heat that can damage the battery cells 214 and/or the processing system 210. As will be described below in greater detail, the battery subsystem 102 may include an integrated cooling system that is configured to extract heat from the battery cells 214 and transfer the heat to the smart enclosure (second housing) of the power system. The temperature sensor of the processing system 210 can monitor the temperature of the battery cells 214 in real time. The microcontroller can then communicate with the power subsystem of the SEC to regulate the flow of coolant through the SEC and/or the battery subsystem 102. For example, when the temperature increases according to the temperature sensor, the microcontroller can request coolant to flow at a higher rate through the battery subsystem 102 and/or the SEC. Conversely, when the temperature decreases or is below an optimal operating temperature, the microcontroller can request coolant to flow at a lower rate through the battery subsystem 102 and/or the SEC. Some embodiments may also include electrical heating coils in the battery subsystem 102 that can be used to heat the battery cells 214 in cold environments.

Figure 3:
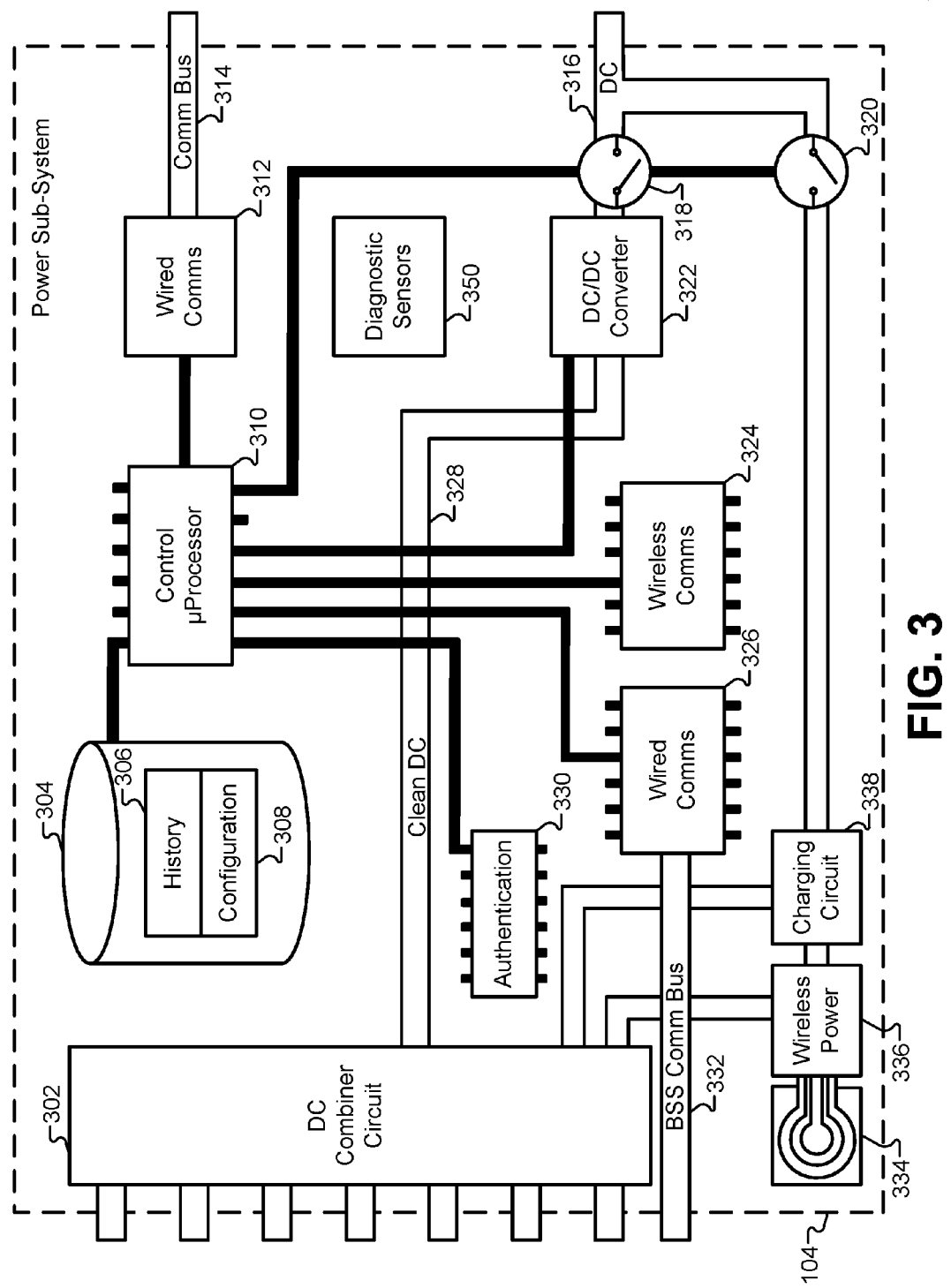
FIG. 3 illustrates a power subsystem of a SEC, according to some embodiments.

FIG. 3 illustrates a power subsystem 104 of a SEC, according to some embodiments. The power subsystem 104 provides a standardized means to aggregate all of the electrical connections and provide monitoring and control of the power flow from each of the battery subsystems in the SEC. First, the power subsystem 104 may include a DC combiner circuit 302 that is electrically coupled to the power interface 216 of each of the battery subsystems in the SEC. The DC combiner circuit can combine each of the DC voltages from the battery subsystems into a DC signal 328 using a ladder of diode-connected circuits.

In some embodiments, a DC/DC converter 322 can be programmed to provide varying levels of DC voltage to the rest of the power system. In some embodiments, the DC/DC converter 322 can provide a 48 V, 45 A signal to a DC port 316. In these embodiments, the native output of each of the battery subsystems may also be 48 V. The DC/DC converter 322 can be programmed, in the case of a failure, to simply provide the raw voltage from the DC combiner circuit 302 to the DC port 316.

The DC port 316 can also receive AC or DC voltage from the power system, which can be used to charge the battery subsystems in the SEC. Switches 318, 320 can be controlled by a microprocessor 310 to change the state of the SEC from a discharging mode to a charging mode. A charging circuit 338 can selectively provide charging power to each of the battery subsystems individually. For example, a particular battery subsystem in the SEC may have discharged more rapidly than the rest, and the charging circuit 338 can direct the power received through the DC port 316 to that particular battery subsystem. In some embodiments, the DC port 316 may include a wired two-pole output connection (+/−) that can be connected in serial/parallel with other SECs.

Some embodiments may also include a wireless power interface to transmit power to the rest of the power system. The power subsystem 104 may include one or more receiving/transmitting coils 334 connected to a wireless power circuit 336. The wireless power circuit 336 can transmit power from the DC combiner circuit 302 or from the DC/DC converter 322 during a discharging state. The wireless power circuit 336 can also receive power that is delivered to the charging circuit 338 during a charging state.

The power subsystem may also include various communication devices that are used to communicate with both the battery subsystems and the rest of the power system external to the SEC. A battery subsystem to communication bus 332 can be connected to a wired communication chip 326 and used to communicate status/state information to/from each of the individual battery subsystems. Additionally or alternatively, the power subsystem 104 may include a wireless communication chip 324, such as a Bluetooth chip, a Wi-Fi chip, and/or the like. The wireless communication chip 324 can be used to communicate with the individual battery subsystems. In some embodiments, both the wired communication chip 326 and the wireless communication chip 324 may be provided, one serving as a backup system to the other.

The wireless communication chip 324 may also be used to communicate with the rest of the power system. For example, the wireless communication chip 324 can communicate with the power subsystem 118 of the smart power system 108 of FIG. 1. Additionally or alternatively, a wired communication chip 312 can communicate via a second wired bus 314 that is shared with other SECs when communicating with the smart power system 108.

The processor 310 can be communicatively coupled to a memory 304 that stores historical information 306 and configuration information 308 for each of the battery subsystems in the SEC. The historical information 306 may include a number of charge/discharge cycles over the lifetime of each battery subsystem, charge/discharge times, times since the last charge, discharge/charge rates, manufacturing dates, expiration information, and so forth. The configuration information 308 may include serial numbers and identification numbers, battery/energy cell types, numbers of battery/energy cells, voltage outputs, maximum currents, temperature operating ranges, and so forth.

In some embodiments, the power subsystem 104 can require authentication information to be verified before power is transmitted through the DC port 316. Switch 318 can be opened until proper authentication information is validated. For example, cryptographic keys and/or signatures may be exchanged between the power subsystem 104 and the smart power system 108 of FIG. 1. An authentication module 330 can perform algorithms that would be known to one having skill in the art to verify that the power subsystem 104 is authorized to provide power through the DC port 316. Handshake information comprising serial number identification and status/state information can be exchanged before the power subsystem 104 allows power to flow through the DC port 316. This authentication feature can be used to prevent theft and enforce lifecycle requirements on the SEC. Because the SECs are designed to be modular and removable, these security features may be beneficial. In some embodiments, the diagnostic systems of the power subsystem 104 and of each of the battery subsystems can detect failures or voltages/currents that are outside the normal operating range. In the case of a failure, the processor 310 can open switches 318, 322 to disable the SEC and prevent the SEC from being used. The switches 318, 322 can also be closed to prevent power flowing from the SEC when the number of charge cycles for the SEC surpasses a threshold, when a battery voltage dips below a threshold voltage, or when the malfunction is detected in the SEC.

Figure 4:
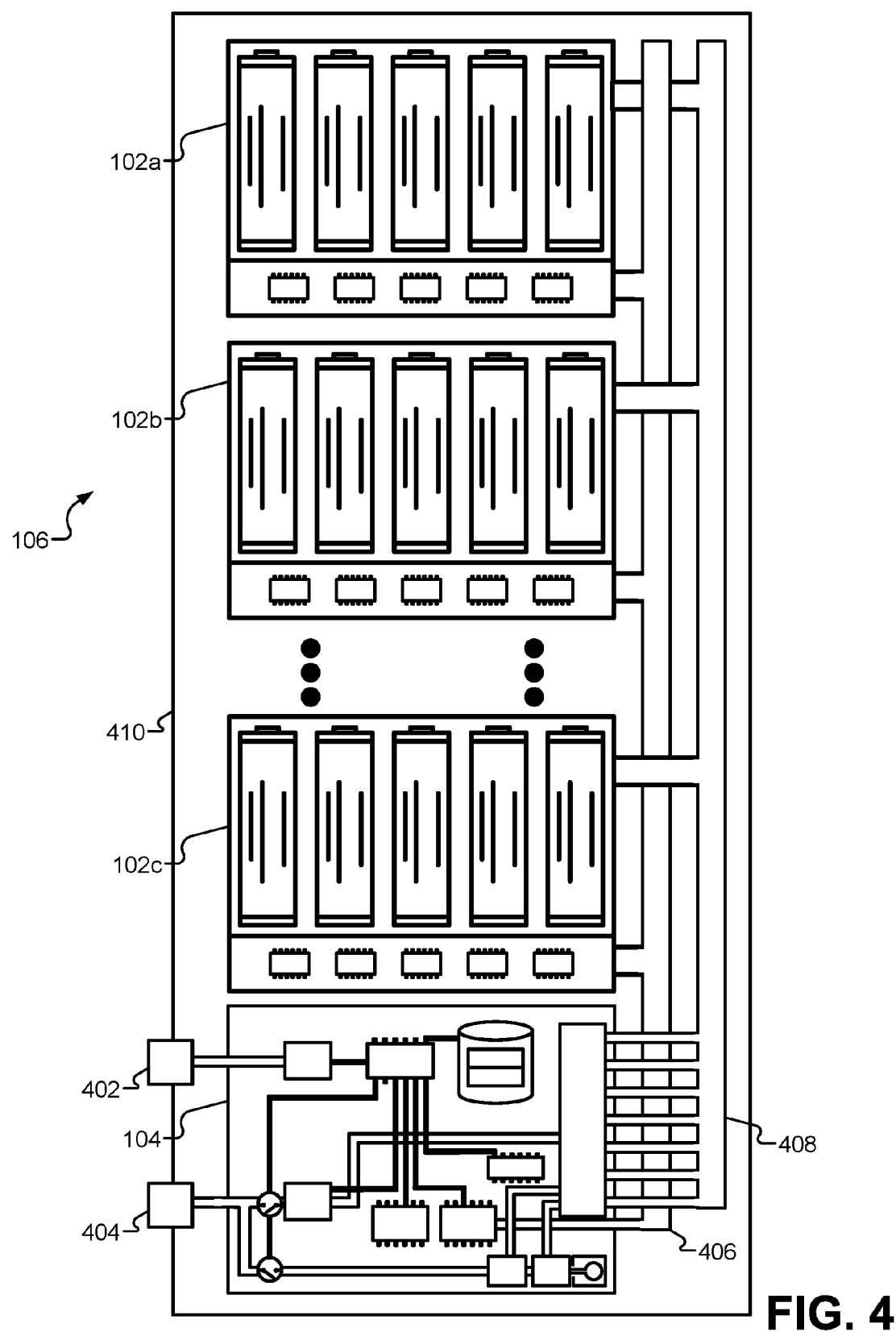
FIG. 4 illustrates a SEC, according to some embodiments.

FIG. 4 illustrates a SEC, according to some embodiments. The SEC includes a plurality of battery subsystems 102 (102a, 102b, 102c, etc.), each of which includes a plurality of individual battery cells and a processing system as described above in relation to FIG. 2. The SEC may also include a power subsystem 104 as described in relation to FIG. 3. A power bus 408 can electrically couple each of the battery subsystems 102 with the power subsystem 104. Note that in some embodiments, the power bus 408 may have dedicated connections between each battery subsystem and an individual DC port on the power subsystem 104. Additionally, a communication bus 406 can communicatively couple each of the battery subsystems 102 to the power subsystem 104.

The SEC may also include a housing 410 that encloses the battery subsystems 102 and the power subsystem 104. In some embodiments, the housing 410 of the SEC may be hermetically sealed, such that access to the internal SEC systems is only available through interfaces in the housing. A first interface 402 can provide communication for status and/or command information to/from the SEC. A second interface 404 can provide a DC voltage from the SEC to the smart power system 108.

Figure 5:
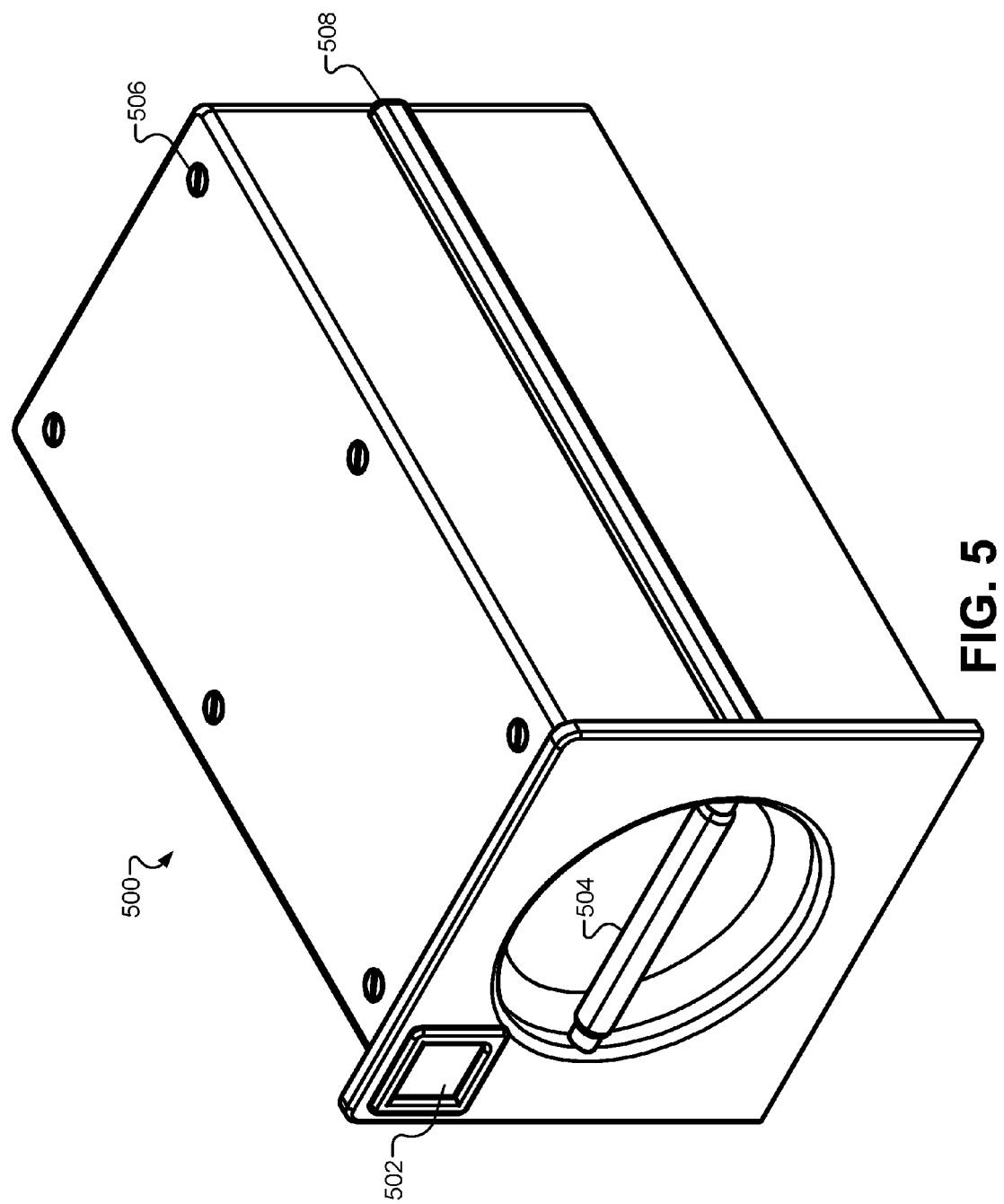
FIG. 5 illustrates a housing of a SEC, according to some embodiments.

FIG. 5 illustrates a housing of a SEC, according to some embodiments. While the physical form and volume of the SEC housing can take any shape or size, some embodiments may be approximately 0.25 cubic feet. These embodiments may be approximately 6"×6"×12". Other embodiments may be approximately 0.125 cubic feet. These embodiments may be approximately 3"×6"×12". SECs may be stackable in a Lego-like fashion on top of each other such that a plurality of SECs can be connected together in a modular fashion and removed/inserted into the rest of the power system. The housing of the SEC may include a mechanically and structurally strong and thermally conductive material such as aluminum. Internally, the SEC may include a chassis to which all of the subsystems (i.e., battery subsystems and the power subsystem) can be mechanically fastened to on both sides. The chassis can be perforated to allow circulation of a thermal material and for wire connections. In some embodiments, the housing can use molded material along the sides that inset between aluminum panels on the top/bottom where thermal transfer may be required.

A handle 504 can be used to insert/remove the SEC from the smart enclosure of the power system. Additionally, the handle 504 can also be used as a locking mechanism to ensure physical contact with the interfaces connecting the SEC with the smart enclosure. By locking the SEC in place, this can guarantee positive engagement between the interfaces and contact with heat transfer mechanisms and electrical terminals. The locking mechanism may be comprised of a screw through the center of the SEC to secure the SEC to the containment unit. Alternatively, the SEC can use locking tabs that extend from the sides of the SEC upon rotation of the handle 504. The handle can be spring-loaded such that the handle disengages the locking mechanism when turned. In another embodiment, the SEC may be secured by closing a lid, cover, or other components over the SECs when they are inserted into the smart enclosure. This locking process may engage a master electrical switch, allowing no power flow unless properly engaged, or to act as a master reset on all control, monitoring, and microprocessor activities.

In some embodiments, the housing of the SEC may include a display 502. The display 502 can be implemented using an LED/LCD active/passive display. The display 502 can be used to communicate status or state of health information of the SEC to a user. Alternatively or additionally, the status or state of health information can be transmitted through NFC or other wireless protocols to a user's smart phone or a similar device. In some embodiments, the status or state of health information can be transmitted to an app, web portal, or electrical control unit of an electric vehicle.

In some embodiments, the SEC may include electrical conductors as part of its frame that can also be used as a means to connect other SEC units together. A pair of guide rails 508 may be used for power transfer with one exposed (typically the negative terminal) and the other recessed. The guide rails 508 can also aid with alignment and stability when inserting/removing the SEC from the smart enclosure.

To allow for easy repair, replacement, recycling, and upgrades for the battery subsystems as battery technologies and chemistries advance, the housing of the SEC may include an accessible cover 506. The cover 506 can be formed from one or more pieces on the outer structure of the SEC and held in place with fasteners, such as screws. The cover 506 can also act as a heat sink between the SEC and the smart enclosure. In embodiments where the SEC is not hermetically sealed, the cover 506 can be vented to allow for airflow.

In some embodiments, the SEC may be hermetically sealed or at least watertight. As described below, when a dangerous condition such as overheating is detected, the housing of the SEC can be flooded with an electrically non-conductive and thermally conductive, and/or fire retardant fluid or material that can absorb heat and prevent any fire hazards. In some embodiments, the SEC can be continuously flooded with these types of materials.

Figure 6:
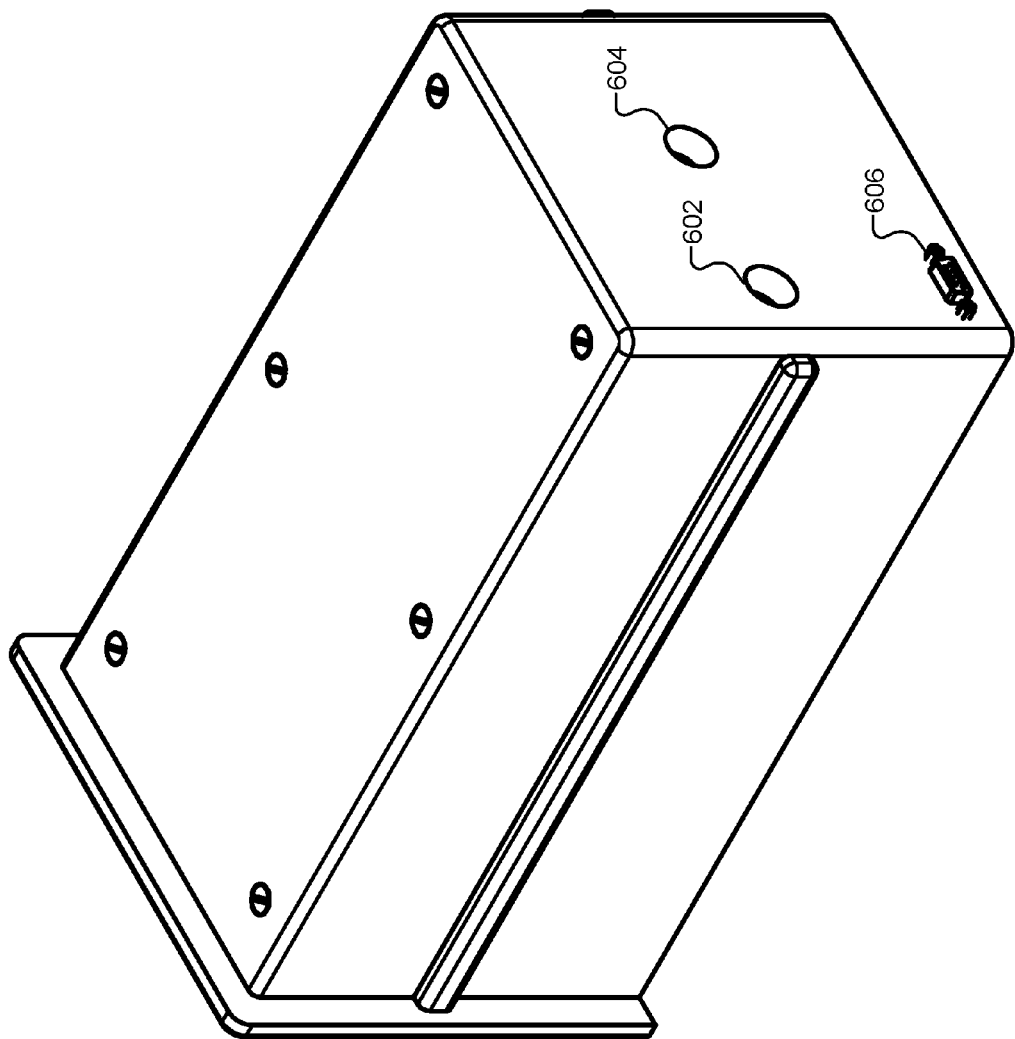
FIG. 6 illustrates a rear view of the housing of a SEC, according to some embodiments.

FIG. 6 illustrates a rear view of the housing of a SEC, according to some embodiments. The housing may include one or more power ports 602, 604 that are recessed into the housing to prevent short-circuits. The power ports 602, 604 are also offset from the center of the housing to ensure correct alignment and polarity upon insertion into the smart enclosure. Alternatively, the guide rails 508 from FIG. 5 may also be used for power transfer as described above.

The housing may also include a communication port 606 that allows for communication between the SEC and the smart power system of the smart enclosure. Some embodiments (not shown) that use liquid cooling systems may also include valves that are recessed into the housing that can accept liquid coolant through corresponding ports in the smart enclosure.

The example of FIG. 6 uses wired communication and power ports. However, as described above, other embodiments may use wireless communication devices (e.g., Bluetooth, Wi-Fi, NFC, etc.) to communicate between the SEC and the smart power module of the smart enclosure. Additionally, other embodiments may use wireless power transfer between the SEC and the smart power system of the smart enclosure. Therefore, the wired communication and power ports of FIG. 6 are not meant to be limiting.

Figure 7:
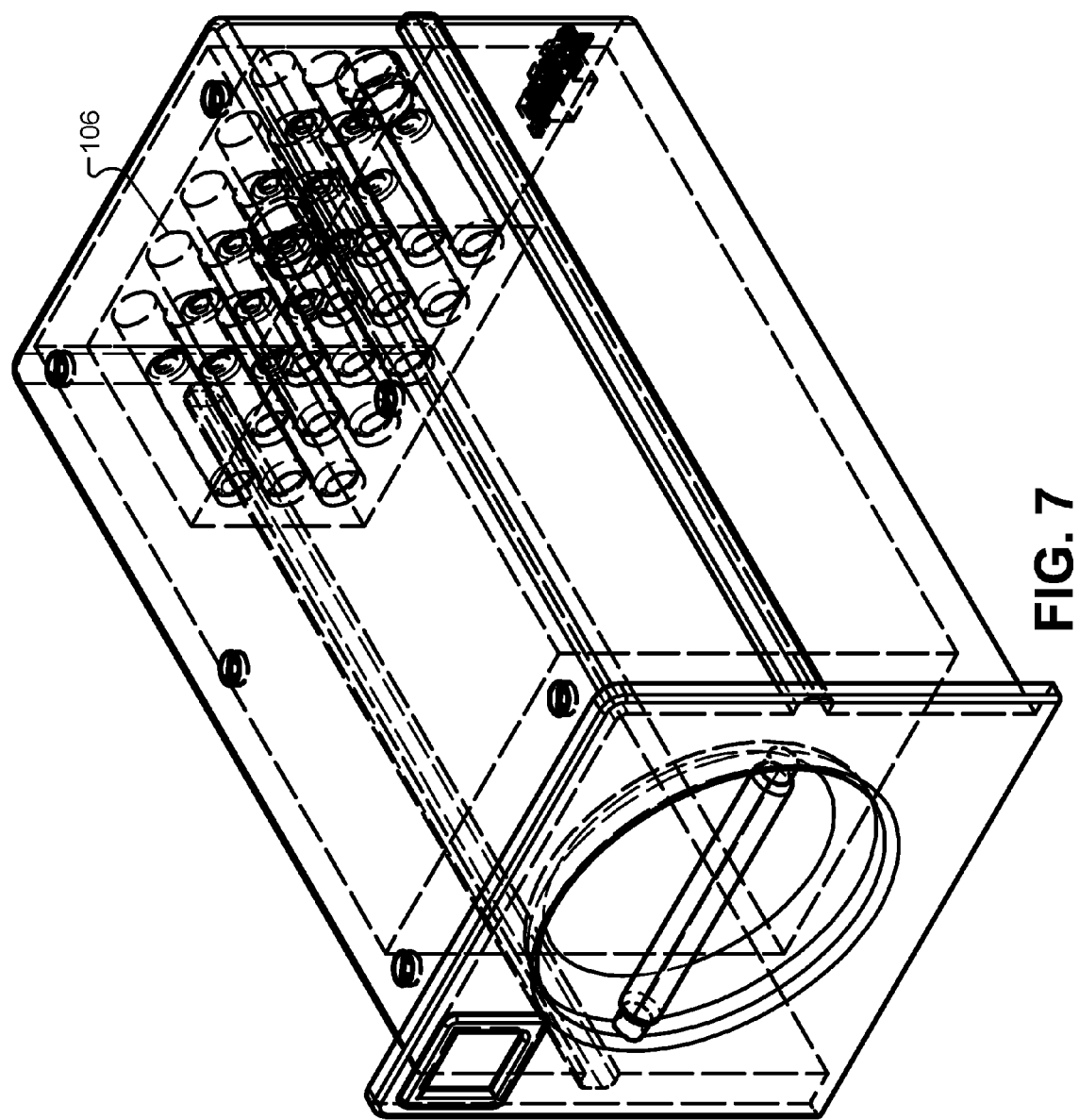
FIG. 7 illustrates a cutaway view of a SEC, according to some embodiments.

FIG. 7 illustrates a cutaway view of a SEC, according to some embodiments. As illustrated, the battery subsystems 106 can be enclosed in respective housings and aligned and/or mounted with in the housing of the SEC. This modularity allows for battery subsystems to gain storage capacity or reduce weight depending on the price/performance criteria for each application as battery storage chemistries evolve. The battery subsystem 106 in FIG. 7 includes 15 individual battery cells. As described above, battery subsystems 106 may include varying numbers of battery cells depending on the application.

Figure 8:
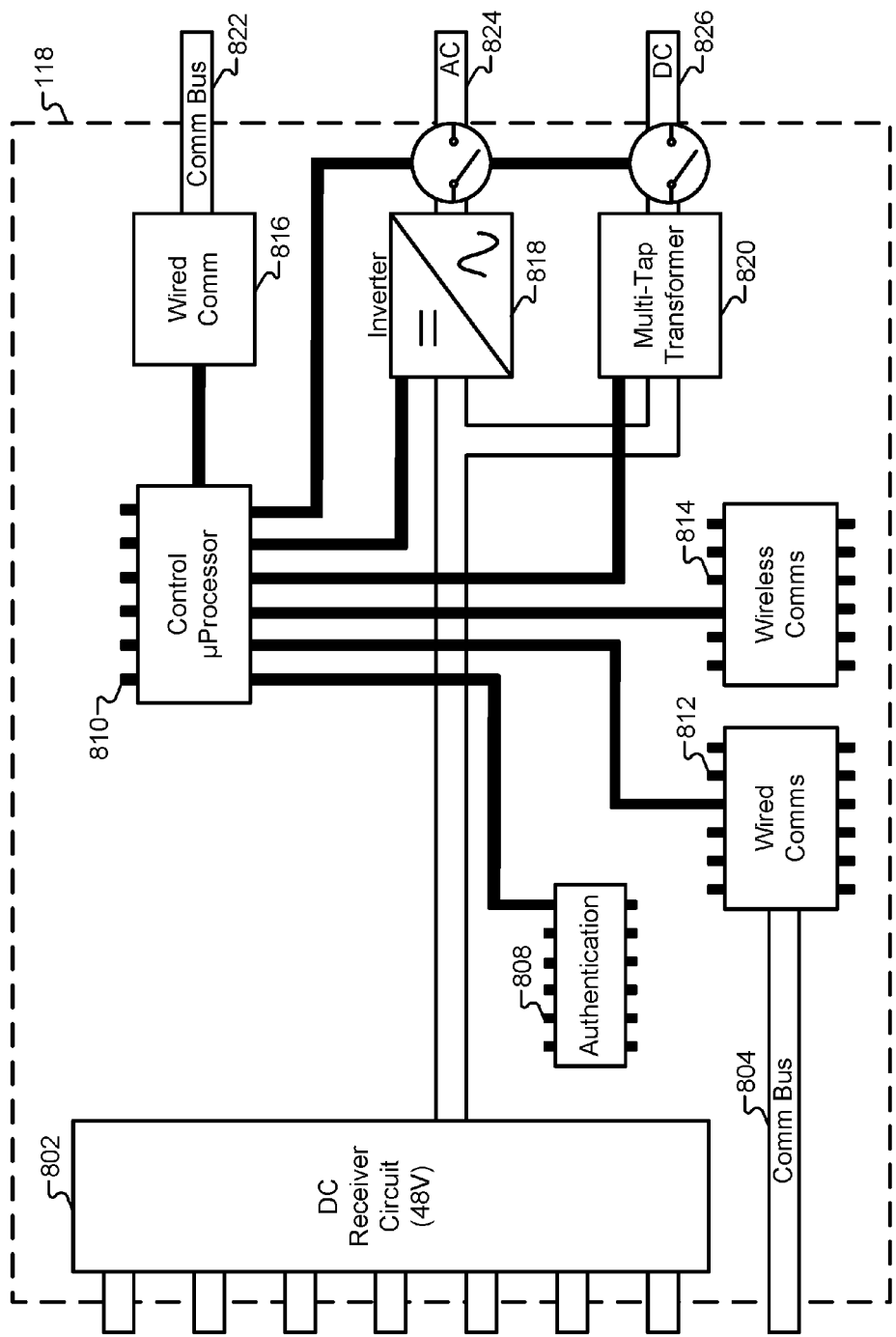
FIG. 8 illustrates a power subsystem of a smart power system, according to some embodiments.

FIG. 8 illustrates a power subsystem 118 of a smart power system 108, according to some embodiments. The power subsystem 118 may be similar to the power subsystem 104 of the SECs. The power subsystem 118 may include a DC receiver circuit 802 that aggregates the DC voltage signals received from each of the SECs. A multi-tap transformer 820 can receive each of the DC signals from the SECs and generate a final DC output 826 based on stored parameters. The DC receiver circuit 802 can receive one input connection per SEC which may be made via an electrical bus connector or a molex-type connector for wiring.

The power subsystem 118 can include a memory that stores configurable parameters such that the power subsystem 118 can be programmed to provide different waveforms. These parameters may form part of an energy profile that can be authenticated, updated in real-time, and stored. In addition to a DC port 826, the power subsystem 118 can include an AC port 824 that is electrically coupled to an AC inverter 818. A processor 810 can retrieve stored parameters and determine what type of AC signal should be generated by the power subsystem 118. For example, the processor 810 can access stored parameters that determine the voltage/current and frequency of an AC output. A load device, such as the electrical system of electric vehicle can communicate the needed electrical characteristics of the output of the power system. When the power subsystem 118 communicates with the load system, it can be dynamically programmed with the proper parameters according to the needs of the load system. For example, the DC output can be configured for between 12 and 48 VDC, between 110-336 VAC, and up to 320 A in some embodiments. In some embodiments, the DC ports 826 and the AC port 824 can be combined into the same physical connection to the smart enclosure, such that the same two-port interface can be used for both output types.

Like the power subsystems of the SECs, the power subsystem 118 may include a communication bus 814 that is communicatively coupled to each of the SECs, a wired communication chip 812, and/or a wireless communication chip 814. An authentication module 808 can be coupled to the processor 810 (or may be an integrated part of the processor 810) and can be used to authenticate communications with the various SECs such that they are enabled to provide power to the power subsystem 118. A wired communication chip 816 and a communication bus 822 can be used to communicate with the load device, such as the electrical system of electric vehicle to receive configuration parameters.

Figure 9:
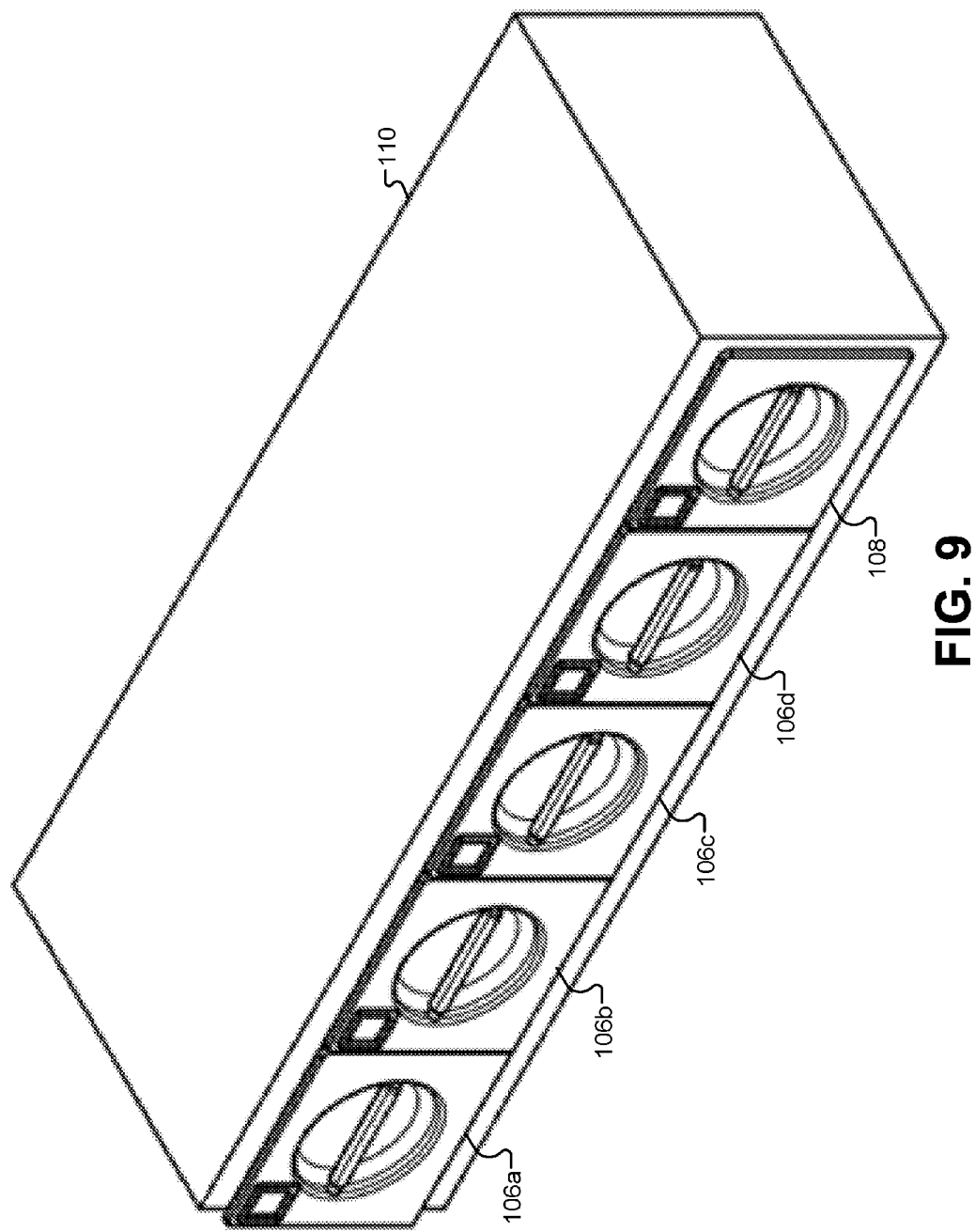
FIG. 9 illustrates the physical arrangement of a smart enclosure with a plurality of SECs and a smart power system, according to some embodiments.

FIG. 9 illustrates the physical arrangement of a smart enclosure 110 with a plurality of SECs 106 and a smart power system 108, according to some embodiments. As illustrated, the smart power system 108 can be constructed to have the same form factor as each of the SECs. Specifically, the smart power system 108 may be constructed from a mechanically strong and thermally conductive material such as aluminum and have an internal chassis that components can be mechanically fastened to on both sides. The housing of the smart power system 108 can incorporate the rotating locking handle to secure the smart power system 108 to the smart enclosure 110. The housing of the smart power system 108 may also be watertight to allow the unit to be flooded with electrically nonconductive and thermally conductive fluid that will absorb heat and act as a fire retardant. As with the SECs described above, the body of the smart enclosure 110 may be used as one or more current carrying conductors to reduce the number of electoral connectors required. For example, the body of the smart enclosure 110 may be used as a negative (−) pole.

When the SECs 106 and the smart power system 108 are inserted into the smart enclosure 110, the smart power system 108 can process the status of each of the SECs that are connected to it to monitor the charge level, temperature, voltage, current, and so forth. In some embodiments, the smart power system 108 can regulate the flow of power to/from the individual SECs 106. For example, if one SEC 106a experiences a voltage sag, the smart power system 108 can take the SEC 106a off-line and compensate using other SECs (106b, 106c, 106d). Additionally, the smart power system 108 can regulate the flow of cooling fluid to each of the SECs 106 based on temperature readings and/or requests received from each of the SECs 106.

The smart enclosure 110 provides the containment unit with the structure to support each of the SECs 106 and the smart power system 108. The smart enclosure 110 also provides electrical and cooling connections as illustrated by FIG. 1. Typically, the smart enclosure 110 can support between three and five SECs 106 and at least one smart power system 108 to govern power flow through the system. In some embodiments, the smart enclosure 110 can have an overall form factor that fits within a standard 19 inch IT rack. In some embodiments the SECs may be located between the rails and skin of an IT enclosure, or within doors or other body panels of an electric vehicle. The internal backplane of the smart enclosure 110 includes electrical and/or communication bus connections as described above that allow for push-pull connections as the different modules are inserted. This can also enable plug-and-play operation as modules are swapped in and out of the smart enclosure 110.

In some embodiments, the smart enclosure 110 may include a coolant flow system that pumps liquid coolant through each of the SECs 106 and/or the smart power system 108. In some embodiments, the structure of the smart enclosure 110 is hollow to allow cooling to flow and circulate through the smart enclosure 110 to remove heat from the modules. For example, instead of pumping coolant through each of the modules in the smart enclosure 110, the smart enclosure can pump coolant through the structure of the smart enclosure to remove heat from the modules themselves. Although not shown, the structure of the smart enclosure 110 can include two ports on opposite ends of the unit that allow cooling connections to be made with a solenoid for flow control. These cooling connections can be coupled to the cooling system of an electronic vehicle.

In some embodiments, the smart enclosure 110 may include an electro-mechanical actuator that allows the smart enclosure 110 to be raised and lowered in the application environment. For example, the smart enclosure 110 can be embedded into a floor or trunk of an electric vehicle. When swapping any of the modules in the smart enclosure 110, the smart enclosure 110 can be raised or lowered such that the modules can be retrieved from the smart enclosure 110.

After swapping, the smart enclosure 110 can be lowered into the floor/trunk of the electric vehicle for convenience.

Figure 10:
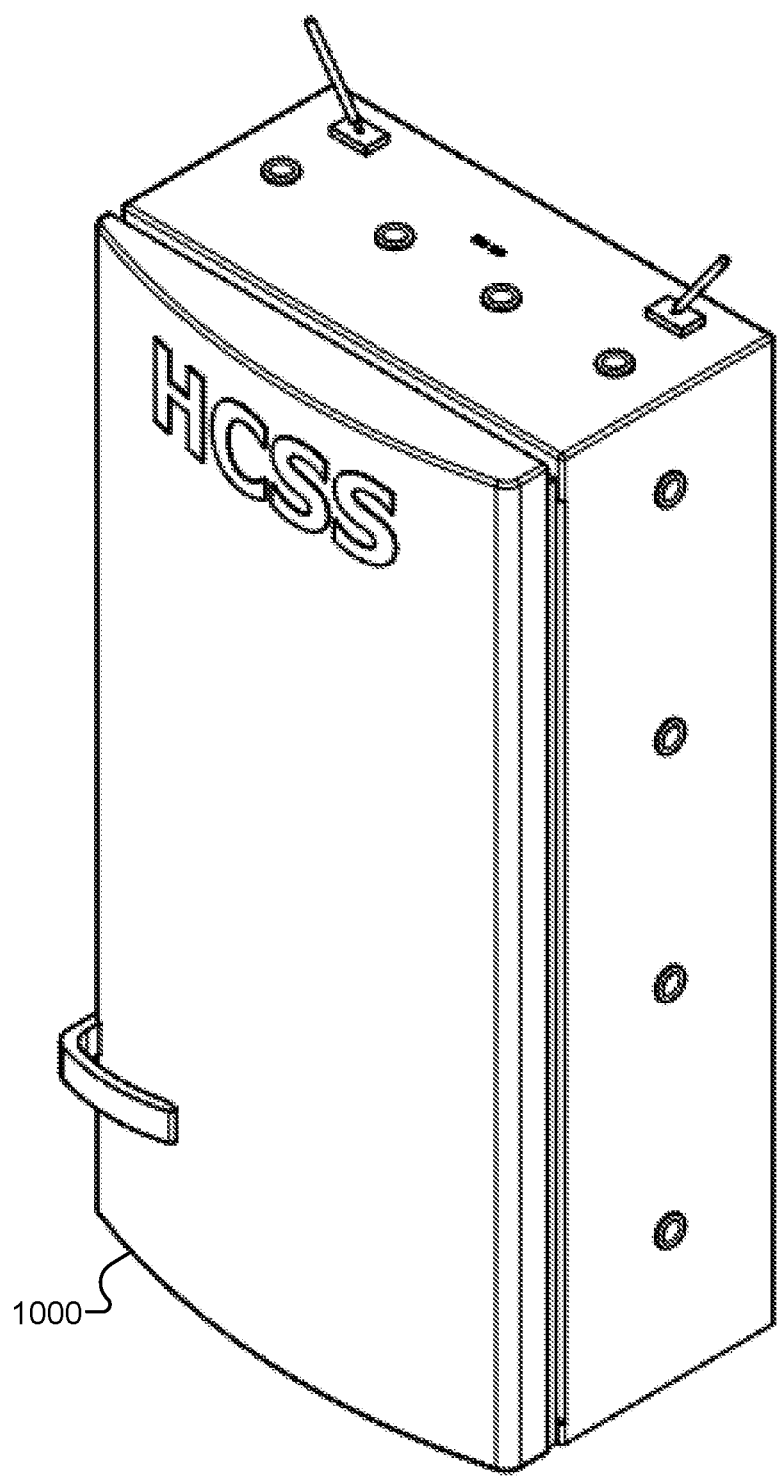
FIG. 10 illustrates a home charging and storage station, according to some embodiments.

FIG. 10 illustrates a home charging and storage station (HCSS), according to some embodiments. The HCSS comprises a system that stores SECs and provides charging, net metering, and other management capabilities. In practice, the HCSS can be used to store and charge individual SECs after they are removed from an electric vehicle. For example, when returning home from a drive, a user can remove SECs from the smart enclosure of the electric vehicle and place them in the HCSS to be recharged. At the same time, the user can remove charged SECs from the HCSS, which can then be inserted into the smart enclosure of the electric vehicle immediately.

The size of the HCSS can vary, but will typically support at least six SECs and one smart power system. The internal surface of the HCSS can mirror the SEC profile and have a similar thermal transfer system as the smart enclosure described above. The HCSS can also include alignment and locking tabs that can mirror those used by the smart enclosure. In short, inserting a SEC into the HCSS can be a very similar experience for a user as inserting and SEC into a smart enclosure in an electric vehicle. The HCSS can support additional cooling systems. For example, the HCSS can include fan-assisted air cooling systems and additional heat sinks that would be too bulky for the smart enclosure.

The HCSS can be connected to a home's electrical power system. During times of low energy usage by the home, the HCSS can charge the SECs stored therein. During times of high energy usage by the home, the HCSS can draw power from charged SECs to provide additional power to the home. Additionally, during demand response (DR) events on the local power grid, the SECs in the HCSS can source additional power to the power grid to take advantage of DR programs offered by a local utility provider. Consequently, the HCSS can incorporate electrical switchgear to prevent backfeeding the grid in the event of a power failure, but can also support net-metering in cases where on-site generation (wind, solar, etc.) is available. From a utility perspective, the HCSS can incorporate meter sockets and intelligence for smart utility meters and other utility-focused features. For example, the HCSS can include a utility meter slot along with provisions to accept conduits another service distribution feeds. The HCSS can function like a basic power source to provide clean power to the consumer and allow the service/utility feed to be disconnected and/or supplemented in the event of a blackout or brownout. The HCSS gateway acts as the communications, monitoring and control hub of the system, which may be deployed as a physical or virtual machine. Aside from local communications and monitoring, the system may also support secure back-channel communications to form an encrypted, mesh network to allow systems, and dependent, authorized users, to communicate status and general data across multiple nodes. This may be supported via wired or wireless technologies, using utility or other communications networks to aggregate data and provide ISP access points. An authorized user, device, or system with the necessary digital certificate and account statue may gain universal access to the network.

Figure 11:
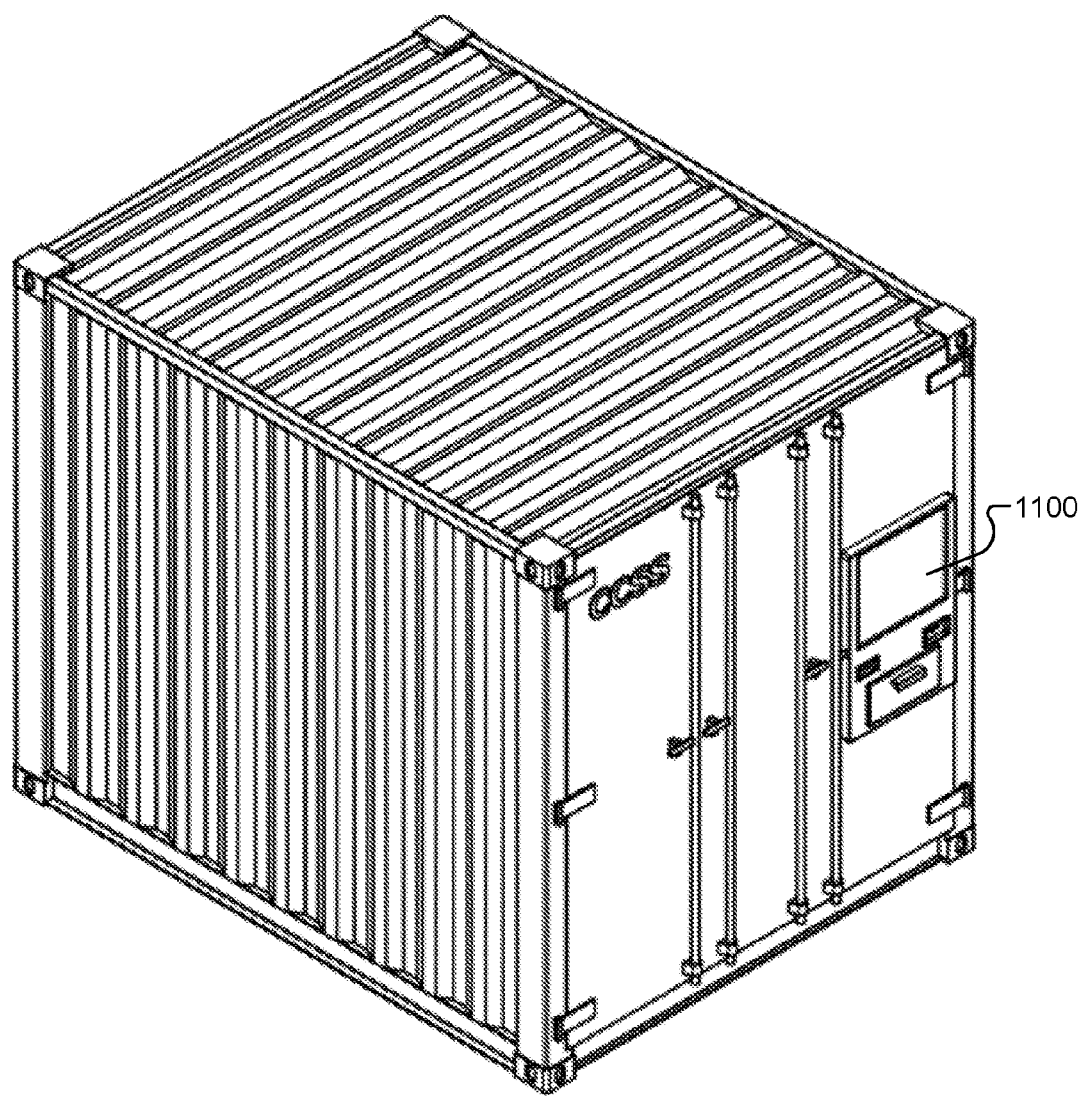
FIG. 11 illustrates a commercial charging and storage station (CCSS), according to some embodiments.

FIG. 11 illustrates a commercial charging and storage station (CCSS), according to some embodiments. As with the HCSS described above, the CCSS comprises a system that stores SECs (and therefore energy), and provides charging, net-metering, and other management capabilities. This may be similar in function to the HCSS, but the CCSS can operate at a larger scale and capacity. For example, the CCSS may typically be of a sufficient size to support up to 500 SECs, and may be the size of a 20 foot shipping container. Inside the CCSS, SECs can be mounted a floor-standing 19" rack that can be up to approximately 7 feet tall. Each rack can include a smart power system that supports and manages all of the SECs in that rack. At the top of each rack, one or more cooling manifolds may be provided (e.g., one for supply, one for return) to connect to each of the cooling fluid ports on the SECs. A heat exchanger can cool the circulated coolant fluid.

In one commercial embodiment, the CCSS can support up to 1 MWh of capacity, 3-phase power, and a 480V AC input/output with a 48V DC feed. As with the HCSS, the CCSS can function like a basic power source to provide clean power to the consumer, and allow the service/utility feed to be disconnected and/or supplemented in the event of a blackout or brownout. Because of its large capacity, the CCSS can be a valuable resource in the utility company's DR strategy. Since the typical CCSS will be on the order of several hundred kWh of capacity and highly distributed, they avoid major utility upgrades and redesign.

In some embodiments, the CCSS can be fully automated like a gas or service station for traditional vehicles. The CCSS can include an automated self-service interface 1100 akin to an ATM at a bank or credit card payment system at a gas pump. The interface 1100 allows a user to exchange discharged SECs for freshly charged SECs through a guided, automated process. The discharged SEC may be placed into a slot/chute, and a freshly charged SEC can be returned in its place. Within the CCSS, a robotic arm can take the discharged SEC and place it in an open slot, allowing it to recharge. The robotic arm can then place a freshly charged SEC back in the user slot. Alternatively, the CCSS may forgo the use of robotics and allow an attendant to manually handle the transaction.

Figure 12:
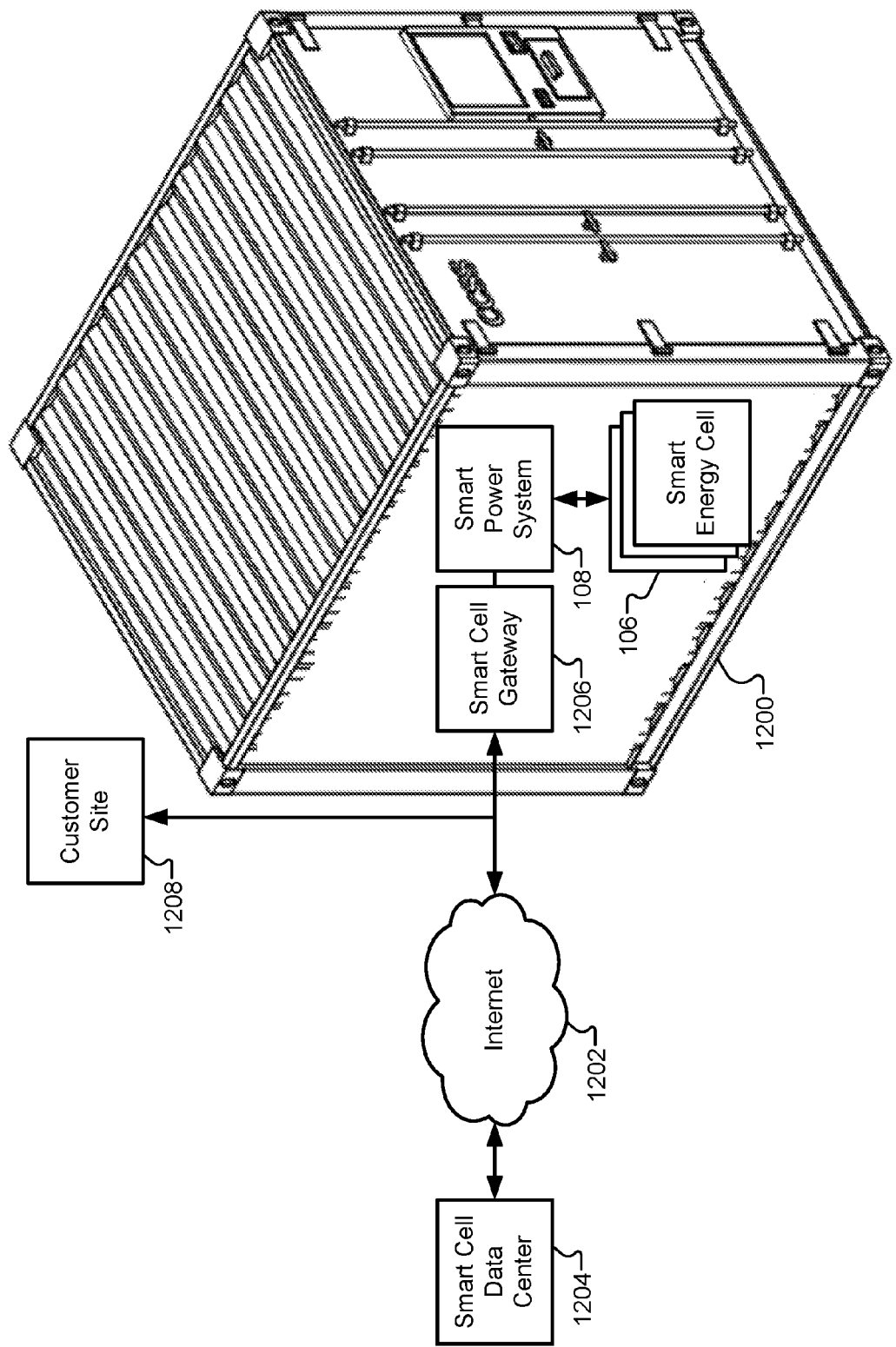
FIG. 12 illustrates a communication architecture for a CCSS, according to some embodiments.

FIG. 12 illustrates a communication architecture for a CCSS 1200, according to some embodiments. As described above, a plurality of SECs 106 can be stored in the CCSS 1200 and governed by at least one smart power system 108. A smart cell gateway 1206 can act as a network interface and data management hub for the on-site infrastructure of the CCSS. The Gateway can receive input from various sensors within the SECs 106, the smart power system 108, and/or the CCSS 1200. The gateway 1206 can also provide local control, continuity, and/or autonomy in the event of a network outage. The gateway 1206 can also be mounted in the standard 19" rack within the enclosure of the CCSS 1200.

The smart power system 108 manages how energy is delivered to/from each of the connected SECs 106. The smart power system 108 can also retrieve status and/or configuration information from each of the SECs 106. The Gateway 1206 can then transmit the status/configuration information to a local customer database 1208. The Gateway 1206 can also transfer this information through the Internet 1202 to a smart cell data center 1204. The data center 1204 can universally store information for each of the SECs registered with the smart cell system. This can also allow other vendors to log into the data center 1204 to locate different SECs and monitor their performance.

Figure 13:
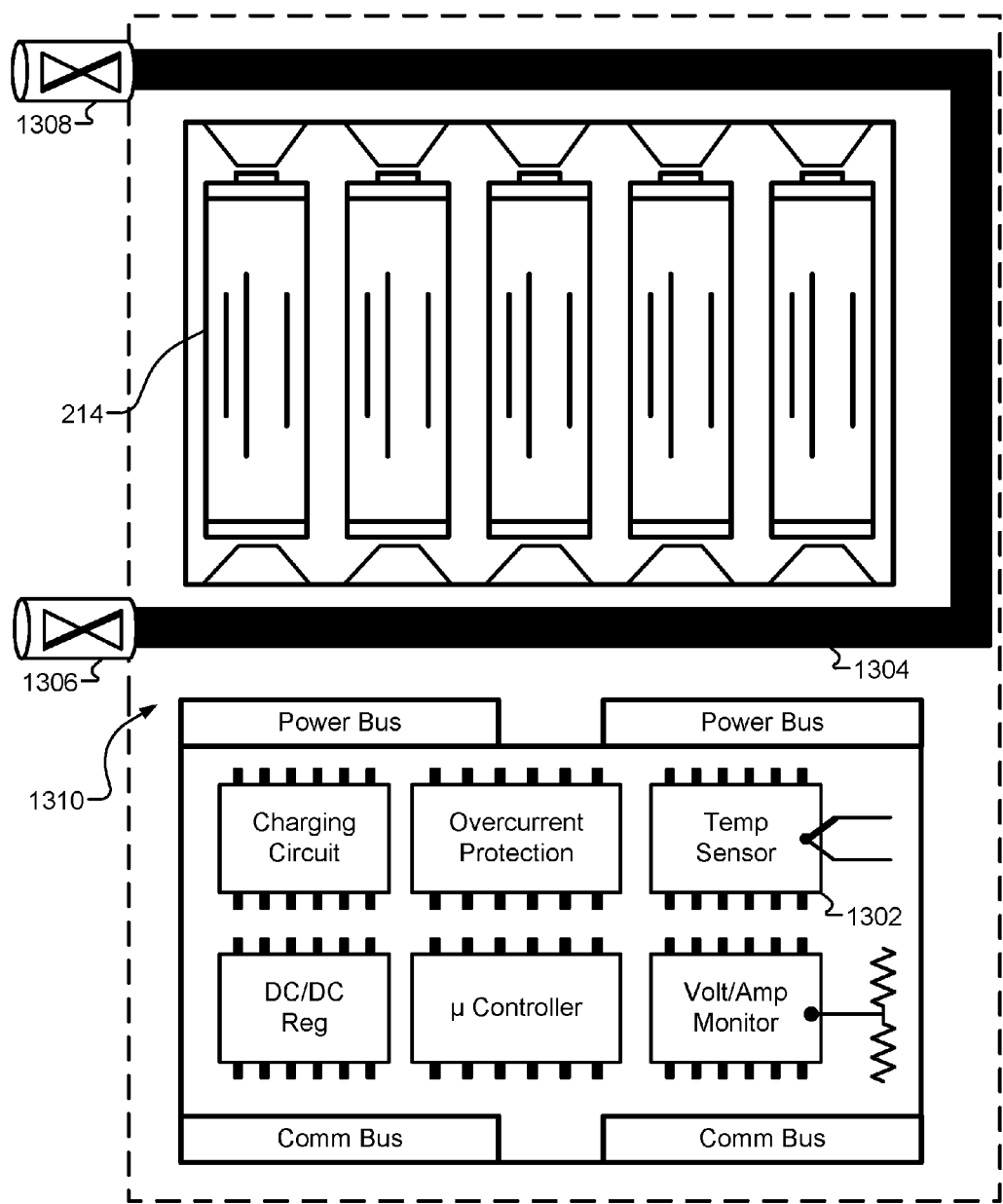
FIG. 13 illustrates a battery subsystem similar to that described in FIG. 2 within an integrated coolant system.

As described briefly above, each of the SECs, battery subsystems, and smart power systems may include integrated cooling systems to remove heat from the battery cells. FIG. 13 illustrates a battery subsystem similar to that described in FIG. 2 with an integrated coolant system. In this embodiment, the battery subsystem may include a thermal material 1310 that is disposed adjacent to the battery cells 214 such that heat can be transferred from the battery cells 214 outside of the battery subsystem. In some embodiments, the thermal material may include a solid material that is thermally conductive and injected into the battery subsystem to substantially fill gaps and spaces between the battery cells 214 and the housing of the battery subsystem. This thermal material can then transfer heat from the battery cells 214 through the thermally conductive housing of the battery subsystem. The thermal material may also include gels or thermal greases that can fill empty space within the battery subsystem. The thermal material may also include a vapor compression that evaporates a liquid that is then condensed away from the battery cells.

The thermal material may also include tubing 1304 that allows liquid coolant to flow through the battery subsystem. In some embodiments, the tubing 1304 can be wrapped around individual battery cells 214 or groups of battery cells 214 to absorb a maximal amount of heat. The tubing 1304 can be coupled to a pair of connectors 1306, 1308 that can be attached to an external coolant flow system.

Figure 14:
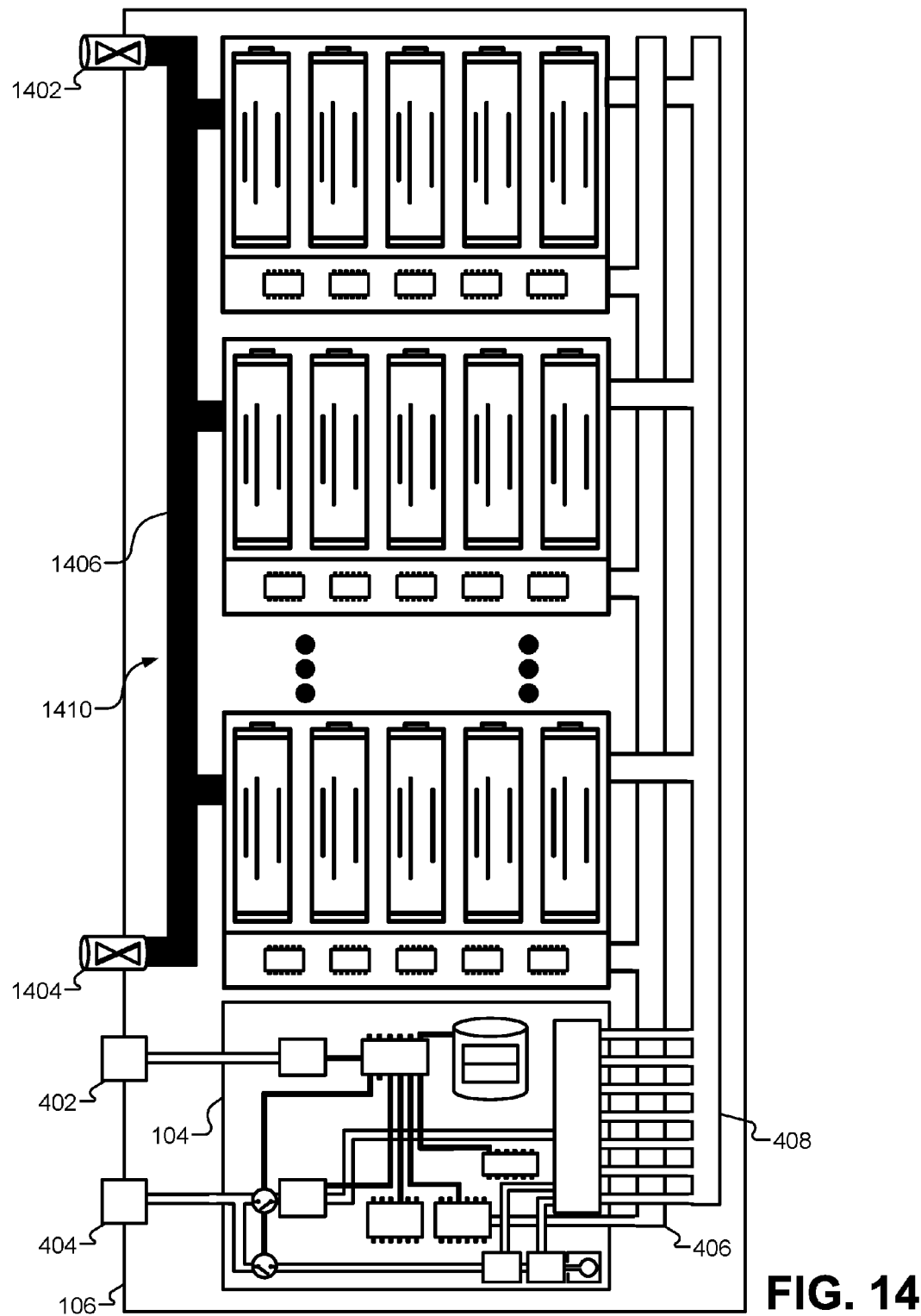
FIG. 14 illustrates a SEC comprising an integrated thermal material, according to some embodiments.

FIG. 14 illustrates a SEC 106 comprising an integrated thermal material, according to some embodiments. Like the battery subsystem described above, the SEC 106 can also include a thermal material 1410 that is injected into the housing of the SEC to substantially fill any gaps between the battery subsystems 102, the power subsystem 104, and the housing of the SEC. The thermal material may include a solid thermally conductive material. The thermal material may also include gels or thermal grease is that couple the internal components of the SEC 106 with the housing of the SEC.

Similar to the battery subsystem, the thermal material 1410 of the SEC 106 may also include tubing 1406 and/or liquid coolant that is circulated through the SEC 106. A pair of connectors 1404, 1402 can be connected to the tubing 1406 and configured to receive liquid coolant that is pumped and provided by the smart enclosure. For example, connector 1402 may comprise an input port, and connector 1404 may comprise an output port. In some embodiments, the tubing 1406 can be wrapped around each of the individual battery subsystems 106 to extract heat from the battery subsystems 106. In some embodiments, the tubing can connect to connectors, such as connectors 1306, 1308 in FIG. 13 on each of the battery subsystems. Thus, coolant can flow from the smart enclosure to the tubing 1406 of the SEC, then into the tubing 1304 of each of the battery subsystems. Connectors 1402 and 1404 may comprise push-pull connectors that can couple automatically as the SEC 106 is inserted into the smart enclosure.

Figure 15:
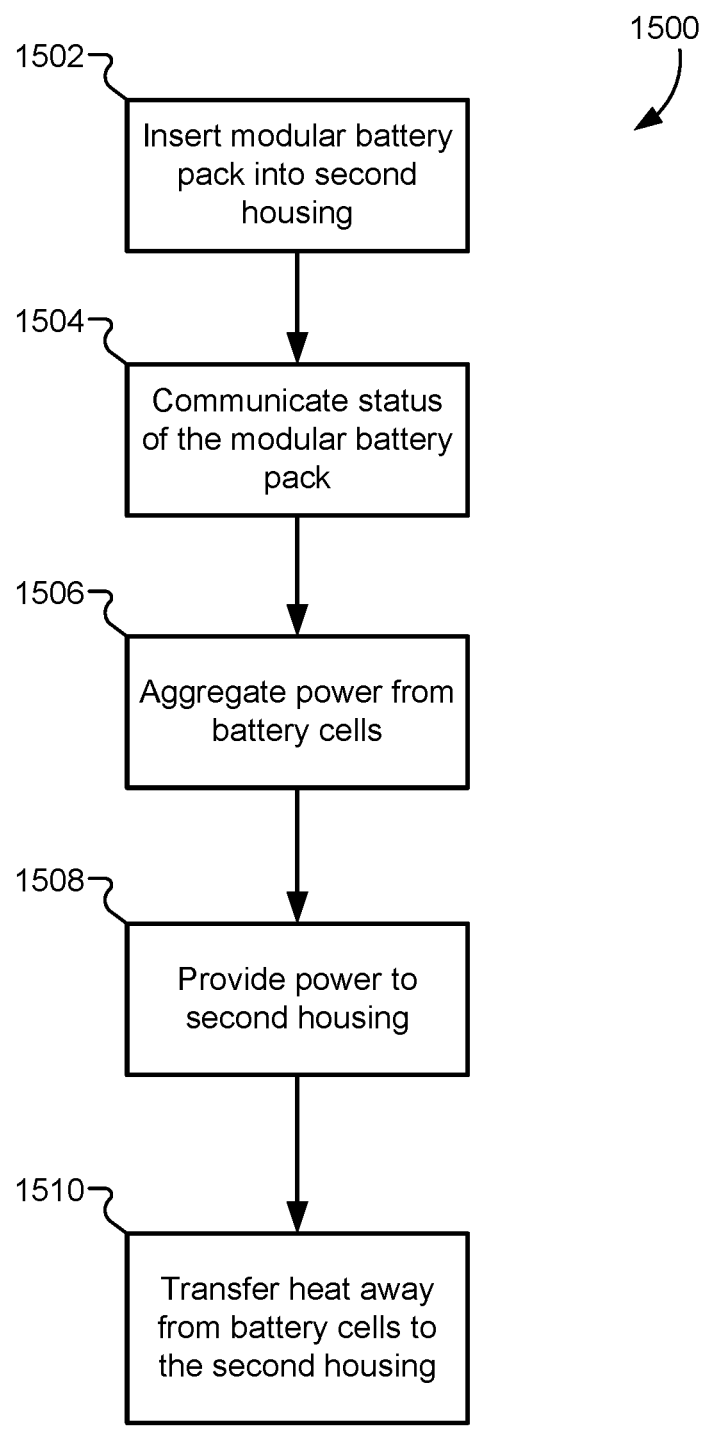
FIG. 15 illustrates a flowchart of a method for providing power through a modular battery pack, according to some embodiments.

FIG. 15 illustrates a flowchart of a method for providing power through a modular battery pack, according to some embodiments. The method may include inserting the modular battery pack into a second housing (1502). The modular battery pack may be one of the SECs described above, and the second housing may include the smart enclosures described above. The modular battery pack may include a first housing such as the housing of the SECs described above, and may have a volume of at least 0.125 cubic feet or 0.25 cubic feet. The second housing of the smart enclosure may be configured to removably receive a plurality of modular battery packs in the form of SECs.

The method may also include communicating, through a first interface of the modular battery pack, a status of the modular battery pack to the second housing (1504). The method may further include aggregating, through a processing system of the modular battery pack, power from a plurality of battery cells enclosed in the first housing (1506). The plurality of battery cells may provide at least 1 kW. Furthermore, the processing system of the modular battery pack may include the power subsystem of the SECs described above. The aggregated power may represent a DC signal transmitted from the SEC to the smart power system of the smart enclosure described above.

The method may further include providing, through a second interface of the modular battery pack, the aggregated power from the plurality of battery cells from the processing system to the second housing (1508). The first interface of the modular battery pack may include the communication port of the SEC that is connected to the smart enclosure. The second interface of the modular battery pack may include the power interface of the SEC that is connected to the smart enclosure.

The method may further include transferring heat away from the plurality of battery cells using a thermal material enclosed in the first housing (1510). The thermal material may include a thermally conductive solid, gel, and/or grease. The thermal material may also include tubing and/or liquid coolant. The thermal material may be circulated through the modular battery pack. Additionally, the thermal material may draw heat away from the battery pack and expel the heat through the first housing of the modular battery pack into the smart enclosure.

It should be appreciated that the specific steps illustrated in FIG. 15 provide particular methods of providing power through modular battery pack according to various embodiments of the present invention. Other sequences of steps may also be performed according to alternative embodiments. For example, alternative embodiments of the present invention may perform the steps outlined above in a different order. Moreover, the individual steps illustrated in FIG. 15 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 16:
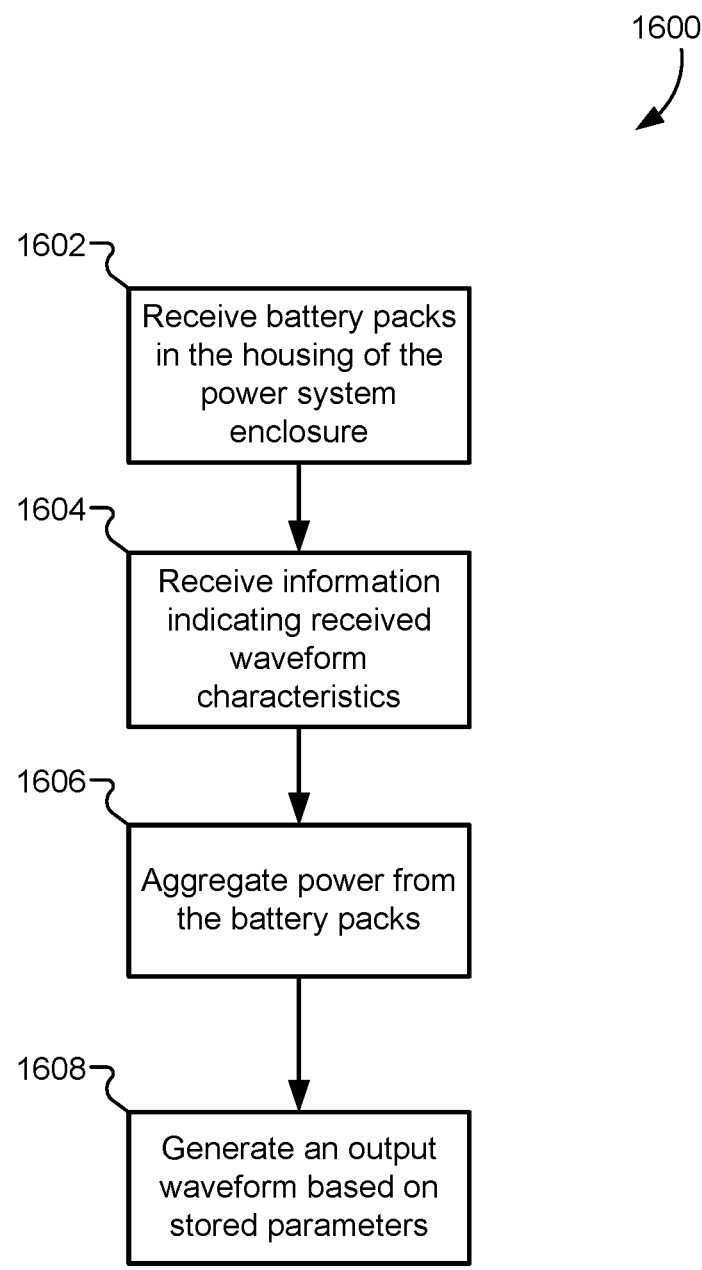
FIG. 16 illustrates a flowchart of a method for using a power system with independent battery packs to generate a defined power output, according to some embodiments.

FIG. 16 illustrates a flowchart of a method for using a power system with independent battery packs to generate a defined power output, according to some embodiments. The method may include inserting a plurality of modular battery packs into a second housing of the power system (1602). The second housing of the power system may include the smart enclosure described above, and the plurality of modular battery packs may include a plurality of SECs described above. Each of the modular battery packs may include a first housing, a plurality of battery cells, a first interface that communicates information associated with the modular battery pack, and a second interface that transmits power from the plurality of battery cells in the modular battery pack.

The method may also include receiving, at a processing system of the power system, the information from each of the plurality of modular battery packs (1604). The processing system of the power system may include the smart power system 108 described in FIG. 1 and elsewhere throughout this disclosure. The information may indicate electrical waveform characteristics for the power received from each of the modular battery packs. For example, the information may include a serial number that can be used to look up voltage/current characteristics and/or battery types for each of the SECs.

The method may additionally include causing, at a processing system of the power system, a waveform generation circuit to aggregate the power received from each of the plurality of modular battery packs according to the respective electrical waveform characteristics (1606). The method may further include causing, at a processing system of the power system, the waveform generation circuit to generate an output electrical signal based on stored parameters (1608).

It should be appreciated that the specific steps illustrated in FIG. 16 provide particular methods of using a power system with independent battery packs according to various embodiments of the present invention. Other sequences of steps may also be performed according to alternative embodiments. For example, alternative embodiments of the present invention may perform the steps outlined above in a different order. Moreover, the individual steps illustrated in FIG. 16 may include multiple sub-steps that may be performed in various sequences as appropriate to the individual step. Furthermore, additional steps may be added or removed depending on the particular applications. One of ordinary skill in the art would recognize many variations, modifications, and alternatives.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A removable modular battery pack comprising:
a first housing having a volume of at least 0.125 cubic feet;
a plurality of battery cells enclosed in the first housing, wherein the plurality of battery cells provides at least 1 kW of power;
a processing system enclosed in the housing that aggregates power from the plurality of battery cells;
a first interface that communicates a status of the modular battery pack to a second housing, wherein the second housing is configured to removably receive a plurality of modular battery packs;
a second interface that transmits the aggregated power from the plurality of battery cells from the processing system to the second housing, wherein the aggregated power from the plurality of battery cells is transmitted from the second housing to power a motor of an electric or hybrid electric vehicle; and
a first thermally conductive fluid enclosed in the first housing, wherein the first thermally conductive fluid is arranged in the housing adjacent to the plurality of battery cells to transfer heat away from the plurality of battery cells and to transfer the heat to the second housing, wherein the second housing comprises a second thermally conductive fluid that is circulated around the removable modular battery pack to absorb the heat transferred from the removable modular battery pack and transfer the heat away from the removable modular battery pack.

2. The modular battery pack of claim 1, wherein:

the processing system comprises a temperature sensor; and the processing system controls a flow of the first thermally conductive fluid into the first housing based on temperature readings received from the temperature sensor.

3. The modular battery pack of claim 1, wherein the first thermally conductive fluid further comprises a nonconductive extinguishing agent.

4. The modular battery pack of claim 1, wherein the plurality of battery cells are grouped in a plurality of battery sub-modules that are individually packaged within the first enclosure.

5. The modular battery pack of claim 4, wherein each of the plurality of battery sub-modules comprises a processor that communicates with the processing system of the modular battery pack.

6. The modular battery pack of claim 4, wherein the modular battery pack comprises between 5 and 9 battery sub-modules, and wherein each of the plurality of battery sub-modules comprises between 10 and 16 lithium-ion 18650 battery cells.

7. The modular battery pack of claim 4, further comprising tubing that is routed adjacent to each of the plurality of battery sub-modules, wherein the first thermally conductive fluid flows through the tubing.

8. A method of providing power through a modular battery pack, the method comprising:

inserting the modular battery pack into a second housing, wherein the modular battery pack comprises a first housing having a volume of at least 0.125 cubic feet, and wherein the second housing is configured to removably receive a plurality of modular battery packs;

communicating, through a first interface of the modular battery pack, a status of the modular battery pack to the second housing;

aggregating, through a processing system of the modular battery pack, power from a plurality of battery cells enclosed in the first housing, wherein the plurality of battery cells provides at least 1 kW of power;

providing, through a second interface of the modular battery pack, the aggregated power from the plurality of battery cells from the processing system to the second housing, wherein the aggregated power from the plurality of battery cells is transmitted from the second housing to power a motor of an electric or hybrid electric vehicle; and transferring heat away from the plurality of battery cells using a first thermally conductive fluid enclosed in the first housing, wherein the thermal material is arranged in the housing adjacent to the plurality of battery cells to transfer heat away from the plurality of battery cells and to transfer the heat to the second housing, wherein the second housing comprises a second thermally conductive fluid that is circulated around the removable modular battery pack to absorb the heat transferred from the removable modular battery pack and transfer the heat away from the removable modular battery pack.

9. The method of claim 8, wherein the modular battery pack further comprises a solid thermal material, and wherein the first housing of the modular battery pack is hermetically sealed.

10. The method of claim 8, wherein the plurality of battery cells comprises a plurality of supercapacitors.

11. The method of claim 8, wherein the first interface comprises a wireless communication system that communicates wirelessly with the second housing.

12. The method of claim 8, wherein the second interface comprises a transmitter coil that wirelessly transmits the aggregated power from the plurality of battery cells to the second housing.

13. The method of claim 8, wherein the second interface comprises a two-pole wired port that mates with a corresponding two-pole wired port of the second housing.

14. The method of claim 8, wherein the volume of the first housing is at least 0.50 cubic feet, having dimensions of approximately 6"×6"×12".

15. The method of claim 8, further comprising communicating, through the first interface of the modular battery pack, a charge history of the modular battery pack to the second housing.

16. The method of claim 8, wherein the aggregated power from the plurality of battery cells provided to the second housing comprises a signal of approximately 48 VDC and 45 A.

17. The method of claim 8, further comprising:

receiving, through the second interface of the modular battery pack, charging power from the second housing, and charging the plurality of battery cells of the modular battery pack using the charging power from the second housing.

* * * * *